United States Patent
Tamaki

(10) Patent No.: US 8,199,615 B2
(45) Date of Patent: Jun. 12, 2012

(54) RECORDING/REPRODUCING APPARATUS AND ADJUSTMENT METHOD THEREFOR

(75) Inventor: Tatsuya Tamaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 37 days.

(21) Appl. No.: 12/708,036

(22) Filed: Feb. 18, 2010

(65) Prior Publication Data

US 2010/0232266 A1    Sep. 16, 2010

(30) Foreign Application Priority Data

Mar. 16, 2009  (JP) ................................. 2009-063615
Jul. 7, 2009   (JP) ................................. 2009-160900

(51) Int. Cl.
*G11B 7/00*   (2006.01)
(52) U.S. Cl. ..................................... 369/44.32
(58) Field of Classification Search .................. None
See application file for complete search history.

(56) References Cited

U.S. PATENT DOCUMENTS

| | | | |
|---|---|---|---|
| 6,324,133 B1 * | 11/2001 | Ichimura | 369/44.27 |
| 6,970,405 B2 | 11/2005 | Tateishi et al. | |
| 7,307,927 B2 * | 12/2007 | Fujita et al. | 369/44.29 |
| 7,852,718 B2 * | 12/2010 | Sagara | 369/44.32 |
| 2004/0151088 A1 * | 8/2004 | Kuze et al. | 369/44.32 |
| 2007/0121471 A1 * | 5/2007 | Isshiki et al. | 369/112.02 |
| 2007/0286037 A1 * | 12/2007 | Miyazaki et al. | 369/44.23 |
| 2008/0232204 A1 * | 9/2008 | Asano | 369/44.23 |
| 2009/0122663 A1 * | 5/2009 | Kondo et al. | 369/44.32 |

FOREIGN PATENT DOCUMENTS

| | | |
|---|---|---|
| JP | 2002-342952 | 11/2002 |
| JP | 4001024 | 8/2007 |
| JP | 4154962 | 7/2008 |

* cited by examiner

*Primary Examiner* — Peter Vincent Agustin
*Assistant Examiner* — Emily Frank
(74) *Attorney, Agent, or Firm* — Oblon, Spivak, McClelland, Maier & Neustadt, L.L.P.

(57) ABSTRACT

A recording/reproducing apparatus includes: a light source; a first correction section to correct a position of an objective lens that collects laser light from the light source on a surface of an optical disc based on a focus bias setting value obtained from a focus bias value; a second correction section to correct an aberration of the laser light based on an aberration correction setting value obtained from an aberration correction value; an evaluation value generation section to generate an evaluation value; a focus bias adjustment section to change plus/minus of the focus bias value and calculate a new focus bias value based on the evaluation value every time a first cycle passes; and an aberration adjustment section to change plus/minus of the aberration correction value and calculate a new aberration correction value every time a second cycle passes, in parallel with an update of the focus bias value.

25 Claims, 29 Drawing Sheets

RECORDING/REPRODUCING APPARATUS AND ADJUSTMENT METHOD THEREFOR

BACKGROUND OF THE INVENTION

1. Field of the Invention

The present invention relates to a recording/reproducing apparatus that uses an optical disc as a recording medium, more particularly, to a recording/reproducing apparatus capable of carrying out a focus bias adjustment and an aberration correction and an adjustment method therefor.

2. Description of the Related Art

A recording/reproducing apparatus that uses an optical disc as a recording medium generates, when laser light is irradiated onto a data recording surface of the optical disc during data recording or data reproduction, a focus error signal that indicates how much the laser light is brought to a focus on the data recording surface. Based on the focus error signal, the recording/reproducing apparatus appropriately moves an objective lens of an optical pickup along an optical axis of the laser axis in a direction that closes in on the data recording surface and an opposite direction to thus focus the laser light on the data recording surface of the optical disc.

In the recording/reproducing apparatus, an error may be caused in the focus error signal due to assembly accuracy of the optical pickup (e.g., error in adjusting arrangement position of optical component), molding accuracy of various components constituting the optical pickup, and the like. Therefore, the recording/reproducing apparatus sets, at a time of start-up, for example, a value (constant value) of a lens position correction signal (hereinafter, referred to as "focus bias") for correcting the position of the objective lens. Further, the recording/reproducing apparatus adds the focus bias to the focus error signal at times of data recording and data reproduction and adjusts the position of the objective lens based on a result of the addition. As a result, even when an error is caused in the focus error signal, the recording/reproducing apparatus corrects the position of the objective lens so as to cancel out the error of the focus error signal by the focus bias to bring the laser light to a focus on the data recording surface of the optical disc.

Moreover, in a case of a high-density optical disc, it is necessary to carry out a spherical aberration correction to deal with a thickness error of a cover layer or a plurality of recording layers in a multilayer structure. Particularly in a recording/reproducing apparatus that includes a lens having high NA, such as a Blu-ray disc, due to a small focus bias/spherical aberration margin, it is essential to carry out a spherical aberration adjustment together with a focus bias adjustment.

As well-known techniques regarding the focus bias adjustment and the spherical aberration adjustment, a method of carrying out a focus bias adjustment and a spherical aberration adjustment at a time of start-up (see, for example, Japanese Patent Application Laid-open No. 2004-95106 and Japanese Patent Application Laid-open No. 2004-241081; hereinafter, referred to as Patent Document 1 and Patent Document 2, respectively), a method of adjusting a focus bias and an aberration by performing sensitivity learning of a focus bias adjustment and an aberration correction during data read and performing a multidimensional search (see, for example, Japanese Patent Application Laid-open No. 2002-342952; hereinafter, referred to as Patent Document 3), and the like are known.

Furthermore, in the recording/reproducing apparatus, it is necessary for an optical axis of light output from the optical pickup to be vertical to a signal recording surface of a disc. Therefore, a tilt adjustment needs to be carried out for adjusting a relationship between the optical axis of the light output from the optical pickup and the signal recording surface of the disc. As well-known techniques regarding the tilt adjustment, a method of adjusting a tilt together with a focus bias and a spherical aberration at a time of start-up, a method of adjusting a tilt together with a focus bias and a spherical aberration during data read (see, for example, Patent Document 3), and the like are known.

SUMMARY OF THE INVENTION

An apparatus that reproduces an optical disc radiates heat due to operations of various circuit blocks, a spindle motor, and the like from after start-up, and an internal temperature thereof rises with time. Due to the rise of the internal temperature, a base member of the optical pickup may be stretched and deformed by the heat, with the result that distances among optical components such as a lens and a laser diode held by the base member in the optical pickup are changed. Consequently, an optimal value for the focus bias is changed due to a change of an error caused in the focus error signal, and an optimal value for the aberration correction is also changed due to a change of an aberration generation amount. Particularly when a plastic lens is used for an optical system of the optical pickup, a spherical aberration generation amount due to a temperature change becomes larger than that in a case where a glass lens is used.

Therefore, as disclosed in Patent Documents 1 and 2, in the methods of carrying out a focus bias adjustment and a spherical aberration adjustment only at a time of start-up, the focus bias adjustment and the aberration adjustment following a change of the internal temperature after the start-up are not carried out.

Further, in the method of carrying out a tilt adjustment at the time of the start-up, a start-up time is prolonged as much as it takes for the tilt adjustment. Specifically, for absorbing a tilt fluctuation of an entire area in a disc radial direction, a tilt adjustment is executed at a plurality of positions in the disc radial direction at the time of the start-up, and a tilt setting value in the entire area in the disc radial direction is calculated by an interpolation method based on a result of the tilt adjustment. Therefore, the tilt adjustment may require a relatively-long time. Moreover, in a case where an inexpensive plastic lens is used for the objective lens, a coma aberration generation sensitivity (lens tilt sensitivity) with respect to a lens tilt fluctuation may fluctuate. In this case, a method of correcting a lens tilt sensitivity fluctuation amount by a temperature and using an adjustment result at a time of start-up is conceivable, but when there is an individual difference in the lens tilt sensitivity fluctuation amount with respect to the temperature, the adjustment may be insufficient.

Furthermore, in the method of adjusting a focus bias, an aberration, and a tilt by performing sensitivity learning of a focus bias adjustment, an aberration correction, and a tilt adjustment during data read and performing a multidimensional search, it may be necessary to increase an amplitude of an adjustment value at the time of the sensitivity learning for improving adjustment accuracy. However, an increase of the amplitude may lead to deterioration of read performance.

In view of the circumstances as described above, there is a need for a recording/reproducing apparatus capable of reducing an amplitude during an adjustment operation and an effect of the adjustment operation on read performance as well as favorably carry out a focus bias adjustment and an aberration adjustment, and an adjustment method therefor.

According to an embodiment of the present invention, there is provided a recording/reproducing apparatus including: a light source to emit laser light; a first correction means for correcting a position of an objective lens that collects the laser light emitted from the light source on a data recording surface of an optical disc based on a focus bias setting value obtained based on a focus bias value; a second correction means for correcting an aberration of the laser light based on an aberration correction setting value obtained based on an aberration correction value; an evaluation value generation means for generating an evaluation value obtained by digitizing a quality of a reproduction signal; a focus bias adjustment means for changing plus and minus of the focus bias value and calculating a new focus bias value based on the evaluation value generated by the evaluation value generation means every time a first cycle passes; and an aberration adjustment means for carrying out, in parallel with an update of the focus bias value set by the first correction means, an aberration adjustment for changing plus and minus of the aberration correction value and calculating a new aberration correction value based on the evaluation value generated by the evaluation value generation means every time a second cycle equal to or longer than the first cycle passes.

In the embodiment of the present invention, by carrying out a focus bias adjustment and an aberration adjustment after start-up, more-optimal values can be obtained as the focus bias value and the aberration correction value following a change of an internal temperature after the start-up, and the focus bias adjustment and the aberration adjustment can be carried out favorably.

Further, in the recording/reproducing apparatus, the focus bias adjustment means obtains a differential between a first evaluation value of a first section in which the focus bias value set by the first correction means is changed to plus and a second evaluation value of a second section in which the focus bias value obtained right after the first section is changed to minus, and calculates the new focus bias value using the current differential value, a previous differential value, and the focus bias value set by the first correction means, and the aberration adjustment means obtains a differential between a third evaluation value of a third section in which the aberration correction value set by the second correction means is changed to plus and a fourth evaluation value of a fourth section in which the aberration correction value obtained right after the third section is changed to minus, and calculates the new aberration correction value using the current differential value, a previous differential value, and the aberration correction value set by the second correction means.

According to the embodiment of the present invention, since an integration effect of the evaluation value is imparted to the calculations of the focus bias adjustment and the aberration adjustment and an effect of a measurement error of a jitter value is thus reduced as much as possible, an amplitude during an adjustment operation and an effect of the adjustment operation on read performance can be reduced.

Furthermore, the recording/reproducing apparatus may further include: a third correction means for correcting a tilt adjustment of the optical disc in a radial direction based on a tilt adjustment value; and a tilt adjustment means for carrying out, in parallel with an update of the aberration correction value set by the second correction means, a tilt adjustment of calculating a new tilt adjustment value based on the evaluation value generated by the evaluation value generation means every time a third cycle equal to or longer than the second cycle passes.

According to the embodiment of the present invention, it is possible to favorably carry out a real-time tilt adjustment while performing the focus bias adjustment and the aberration adjustment after the start-up. In addition, since an integration effect of the evaluation value is imparted to the calculation of the real-time tilt adjustment and the effect of the measurement error of the jitter value is thus reduced as much as possible, the amplitude during the adjustment operation and the effect of the adjustment operation on read performance can be reduced.

According to the embodiment of the present invention, it is possible to reduce an amplitude during an adjustment operation and an effect of the adjustment operation on read performance as well as favorably carry out a focus bias adjustment and an aberration adjustment.

These and other objects, features and advantages of the present invention will become more apparent in light of the following detailed description of best mode embodiments thereof, as illustrated in the accompanying drawings.

DESCRIPTION OF PREFERRED EMBODIMENTS

Hereinafter, embodiments of the present invention will be described with reference to the drawings.

First Embodiment

Figure 1:
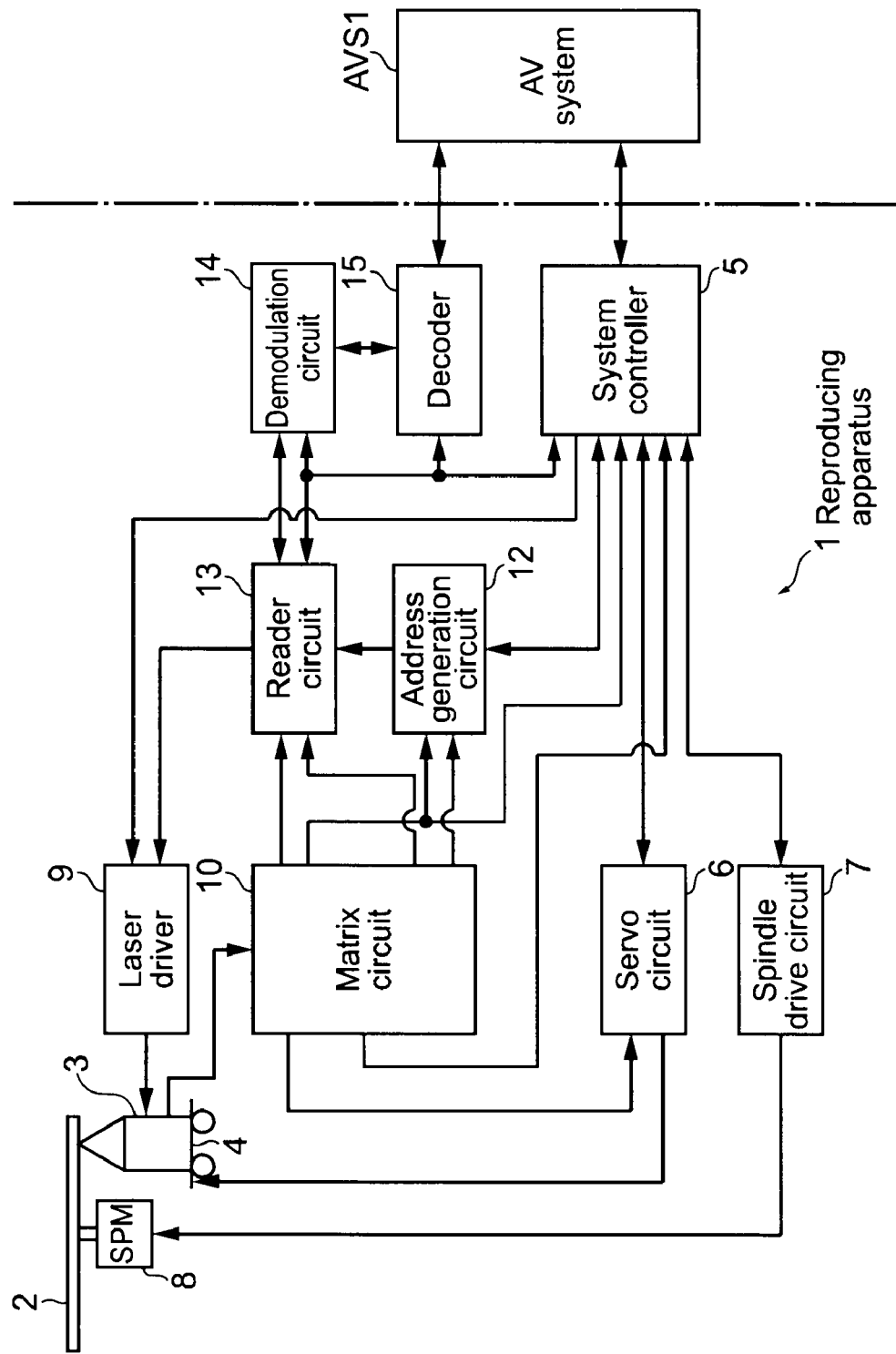
FIG. 1 is a block diagram showing hardware of a reproducing apparatus according to a first embodiment of the present invention.

FIG. 1 is a block diagram showing hardware of a reproducing apparatus according to a first embodiment of the present invention.

(Overall Structure)

In FIG. 1, an optical disc 2 can be loaded into a reproducing apparatus 1. In the reproducing apparatus 1, an optical pickup 3 is provided so as to oppose a data recording surface of the optical disc 2 loaded into the reproducing apparatus 1. Moreover, the optical pickup 3 is held while being movable in a radial direction of the optical disc 2 (hereinafter, referred to as "disc radial direction") by a thread mechanism section 4.

On the optical disc 2 used for reproducing data in the reproducing apparatus 1, wobbling (i.e., meandering) grooves (i.e., guide grooves) are formed on the data recording surface in advance with a constant linear velocity so as to have a constant frequency, and the grooves (and inter-groove lands) become tracks on which data is recorded. Further, in the optical disc 2, address information on the data recording surface (hereinafter, referred to as "disc address information) called ADIP (Address In Pre Groove) is embedded in the wobbling of the grooves. Furthermore, the optical disc 2 includes a plurality of recording layers.

In the reproducing apparatus 1, a system controller 5 constituted of, for example, a microcomputer collectively controls the entire apparatus in response to various commands such as a read command given from an external AV (Audiovisual) system AVS1 and executes various types of processing. Accordingly, the system controller 5 is put to a start-up mode when a power-on command is input and the reproducing apparatus 1 is activated in a state where the optical disc 2 is loaded therein or when the optical disc 2 is loaded (or replaced) in the reproducing apparatus 1 in an operable state after activation (i.e., power-on state).

At this time, a servo circuit 6 drives the thread mechanism section 4 and moves the optical pickup 3 to a position opposing an innermost circumference of the optical disc 2, for example, under control of the system controller 5. Further, a spindle drive circuit 7 drives a spindle motor 8 and causes the optical disc 2 to rotate at a constant velocity under control of the system controller 5. Furthermore, when the optical disc 2 is rotated, a laser driver 9 generates a laser control signal for successively emitting laser light and transmits the signal to the optical pickup 3 under control of the system controller 5.

Upon receiving the laser control signal from the laser driver 9, the optical pickup 3 causes a laser diode to successively emit laser light based on the laser control signal and also causes an objective lens to collect the emitted laser light so as to irradiate it onto the data recording surface of the optical disc 2. The optical pickup 3 also receives reflected light obtained as a reflection of the laser light reflected by the data recording surface of the optical disc 2 using, for example, a plurality of light-receiving devices, and photoelectrically converts the reflected light. Accordingly, the optical pickup 3 generates a signal of a current value (hereinafter, referred to as "photoelectric signal") corresponding to a light amount of the reflected light received by the plurality of light-receiving devices and transmits the signal to a matrix circuit 10.

Upon receiving the photoelectric signals generated by the plurality of light-receiving devices from the optical pickup 3, the matrix circuit 10 executes matrix operation processing, amplification processing, and the like by selectively using voltage values obtained by converting the photoelectric signals. Accordingly, the matrix circuit 10 generates a focus error signal that indicates how much the laser light is brought to a focus on the data recording surface of the optical disc 2 based on the photoelectric signals.

The matrix circuit 10 also generates, based on the photoelectric signals, a tracking error signal that indicates how accurate an irradiation position of the laser light is with respect to the tracks of the data recording surface of the optical disc 2. Then, the matrix circuit 10 transmits the focus error signal and the tracking error signal to the servo circuit 6.

Incidentally, at this time, under control of the system controller 5, the servo circuit 6 generates a focus search signal for searching for a desired position of the objective lens at which the laser light is to be brought to a focus on the data recording surface of the optical disc 2 and transmits the signal to the optical pickup 3. Accordingly, while moving the objective lens along the optical axis so that it closes in on the data recording surface of the optical disc 2 by the focus search signal in the optical pickup 3, for example, the servo circuit 6 carries out a focus drawing operation so as to bring the laser light to a focus on the data recording surface based on the focus error signal input from the matrix circuit 10 at that time.

Then, upon ending the focus drawing operation, the servo circuit 6 subsequently generates a focus control signal based on the focus error signal input from the matrix circuit 10 and transmits the signal to the optical pickup 3. Accordingly, the servo circuit 6 appropriately moves, based on the focus control signal, the objective lens along the optical axis in the optical pickup 3 in a direction in which the objective lens closes in on the data recording surface of the optical disc 2 (hereinafter, referred to as "approaching direction") and an opposite direction in which the objective lens moves away from the data recording surface of the optical disc 2 (hereinafter, referred to as "parting direction"), to thus bring the laser light to a focus on the data recording surface of the optical disc 2. The servo circuit 6 thus forms a focus servo loop with the optical pickup 3 and the matrix circuit 10 and causes a focal point of the laser light to follow the data recording surface of the optical disc 2.

Moreover, under control of the system controller 5, the servo circuit 6 generates a track search signal for positioning the irradiation position of the laser light on the track of the data recording surface of the optical disc 2 and transmits the signal to the optical pickup 3. Accordingly, while gradually moving the objective lens in the disc radial direction by the track search signal in the optical pickup 3, for example, the servo circuit 6 carries out a track drawing operation of laser light so as to position the irradiation position of the laser light on the track of the data recording surface based on the tracking error signal input from the matrix circuit 10 at that time.

Then, upon ending the track drawing operation of the laser light as described above, the servo circuit 6 subsequently generates a tracking control signal based on the tracking error signal input from the matrix circuit 10 and transmits the signal to the optical pickup 3. Accordingly, the servo circuit 6 appropriately moves, based on the tracking control signal, the objective lens in the disc radial direction in the optical pickup 3 so that the laser light is irradiated onto the track of the optical disc 2. Thus, the servo circuit 6 also forms a tracking servo loop with the optical pickup 3 and the matrix circuit 10 and causes the irradiation position of the laser light to follow the tracks of the optical disc 2.

Furthermore, upon ending the focus drawing operation and the track drawing operation, the matrix circuit 10 executes matrix operation processing, amplification processing, and the like by selectively using the voltage values obtained by converting the plurality of photoelectric signals transmitted from the optical pickup 3. Accordingly, the matrix circuit 10 generates a wobble signal that indicates an amplitude of wobbling (hereinafter, referred to as "wobble amplitude") of the grooves formed on the optical disc 2 together with the focus error signal and the tracking error signal based on the photoelectric signals.

The matrix circuit 10 demodulates the generated wobble signal, generates stream data for detecting disc address information, and transmits the stream data to an address generation circuit 12. Then, the address generation circuit 12 subjects the stream data to decode processing and transmits the disc address information obtained as a result of the decode processing to the system controller 5.

Accordingly, the system controller 5 can detect the irradiation position of the laser light on the data recording surface of the optical disc 2 based on the disc address information from the address generation circuit 12. Incidentally, the system controller 5 is put to a state where the irradiation position of the laser light on the data recording surface of the optical disc 2 can be detected as the disc address information, for example, and shifts from the start-up mode to a reproduction mode when a read command is transmitted from the AV system AVS1.

At this time, when address information indicating a read start position of data is designated by the AV system AVS1, the system controller 5 compares the disc address information transmitted from the address generation circuit 12 (i.e., irradiation position of laser light on data recording surface of optical disc 2 at that time point) with the address information indicating the read start position and generates a seek command signal as appropriate. Then, the system controller 5 transmits the seek command signal to the servo circuit 6.

Upon receiving the seek command signal from the system controller 5, the servo circuit 6 temporarily releases the tracking servo loop. Then, the servo circuit 6 generates a seek control signal based on the seek command signal and transmits the seek control signal to the thread mechanism section 4. Accordingly, the servo circuit 6 drives the thread mechanism section 4 based on the seek control signal and causes the optical pickup 3 to seek while jumping over the plurality of tracks in the disc radial direction.

The system controller 5 instructs the laser driver 9 of a read output value with respect to the laser light. Thus, the laser driver 9 generates a laser control signal for successively irradiating the laser light by the read output in response to the instruction from the system controller 5 and transmits the laser control signal to the optical pickup 3.

Accordingly, the optical pickup 3 successively emits the laser light from the laser diode by the read output based on the laser control signal transmitted from the laser driver 9 and collects the irradiated laser light by the objective lens to irradiate it onto the data recording surface of the optical disc 2. The optical pickup 3 also receives and photoelectrically converts the reflected light as a reflection of the laser light reflected by the data recording surface of the optical disc 2 using the plurality of light-receiving devices to generate photoelectric signals, and transmits the signals to the matrix circuit 10.

Upon receiving the plurality of photoelectric signals from the optical pickup 3, the matrix circuit 10 executes matrix operation processing, amplification processing, and the like by selectively using voltage values obtained by converting the photoelectric signals. Accordingly, the matrix circuit 10 generates a high-frequency signal (hereafter, referred to as "RF signal") corresponding to data to be reproduced together with the focus error signal, the tracking error signal, and the wobble signal based on the photoelectric signals. Then, the matrix circuit 10 transmits the RF signal to a reader circuit 13 as well as transmit the focus error signal and the tracking error signal to the servo circuit 6.

The reader circuit 13 sequentially carries out binarization processing, PLL (Phase Lock Loop) processing, reproduction data generation processing, and the like with respect to the RF signal transmitted from the matrix circuit 10, transmits modulation data obtained as a result of the processing to a demodulation circuit 14, and supplies operation clocks generated by the PLL processing to the respective sections.

The demodulation circuit 14 operates in sync with operation clocks for reproduction processing supplied from the reader circuit 13 at this time. Then, the demodulation circuit 14 subjects the modulation data transmitted from the reader circuit 13 to demodulation processing such as run-length limited decode processing and transmits encoded data obtained as a result of the decode processing to a decoder 15.

The decoder 15 operates in sync with the operation clocks for reproduction processing supplied from the reader circuit 13 at this time. Then, the decoder 15 subjects the encoded data transmitted from the demodulation circuit 14 to error detection correction processing or decode processing such as deinterleave for each unit block added with an error correcting code, for example, to generate data to be reproduced, and stores the generated data in a built-in buffer.

Moreover, in response to a command from the AV system AVS1, the decoder 15 reads out, every time data corresponding to a predetermined number of unit blocks like four unit blocks is stored in the buffer, the data corresponding to the predetermined number of unit blocks from the buffer and transfers the data to the AV system AVS1. As described above, the system controller 5 can reproduce the data recorded onto the data recording surface of the optical disc 2 and transfer it to the AV system AVS1.

Incidentally, in a case where a read command is not input from the AV system AVS1 even when the system controller 5 is put to a state where the irradiation position of the laser light on the data recording surface of the optical disc 2 can be detected as the disc address information in the start-up mode, the mode shifts from the start-up mode to a standby mode. At this time, the system controller 5 continues to detect the irradiation position of the laser light on the data recording surface of the optical disc 2 as the disc address information. Accordingly, although the system controller 5 shifts to the reproduction mode when receiving a read command from the AV system AVS1 during the standby mode, at that time, the irradiation position of the laser light with respect to the data recording surface of the optical disc 2 can be easily detected and data read from the optical disc 2 can be readily started.

(Structure of Optical Pickup 3)

Figure 2:
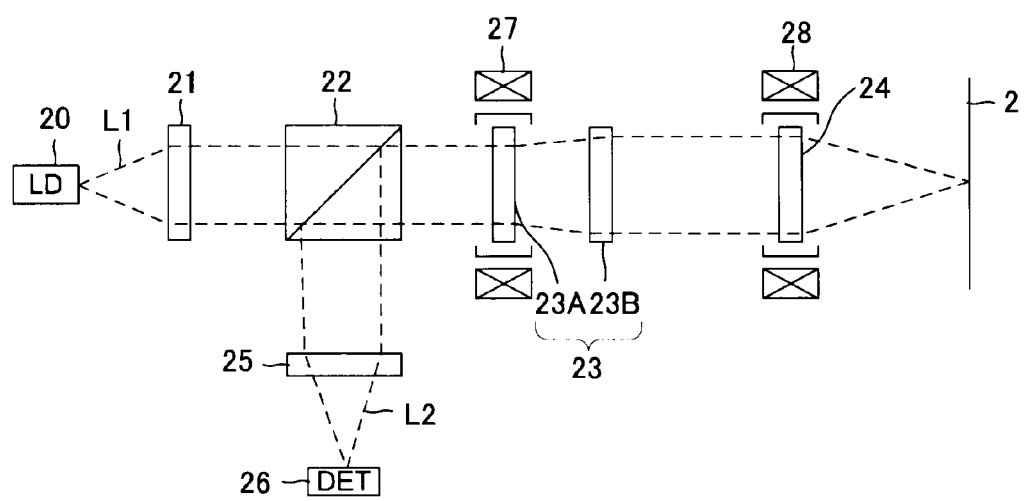
FIG. 2 is a block diagram showing a structure of an optical pickup shown in FIG. 1.

FIG. 2 is a diagram showing a structure of the optical pickup 3. The optical pickup 3 includes a laser diode 20 as a light source and takes in the laser control signal transmitted from the laser driver 9 in the laser diode 20. The optical pickup 3 causes laser light L1 emitted from the laser diode 20 based on the laser control signal to pass through a collimator lens 21 to convert it into parallel light. After that, the parallel light successively passes through a beam splitter 22 and a spherical aberration correction lens group 23 and is collected by an objective lens 24 to be irradiated onto the data recording surface of the optical disc 2.

Moreover, after reflected light L2 obtained by reflecting the laser light L1 by the data recording surface of the optical disc 2 is successively passed through the objective lens 24 and the spherical aberration correction lens group 23 and reflected by the beam splitter 22, the optical pickup 3 collects the light by a collimator lens 25 and receives the light by a plurality of light-receiving devices provided in a light-receiving portion 26. Then, the optical pickup 3 photoelectrically converts the reflected light L2 by the plurality of light-receiving devices of the light-receiving portion 26 and transmits photoelectric signals obtained as a result of the conversion to the matrix circuit 10.

Here, the spherical aberration correction lens group 23 includes a movable lens 23A and a fixed lens 23B. The movable lens 23A is held while being movable in the approaching direction and the parting direction (hereinafter, approaching direction and parting direction may also be collectively referred to as "optical-axis direction") along the optical axis by an actuator 27. The spherical aberration correction lens group 23 is structured so that, when the movable lens 23A is moved as appropriate in the optical-axis direction by the actuator 27, a wavefront of the laser light L1 is defocused and an object point of the objective lens 24 can thus be adjusted in accordance therewith. As a result, a spherical aberration caused in the laser light L1 can be corrected.

Further, the objective lens 24 is held while being movable in the optical-axis direction and the disc radial direction by a biaxial actuator 28. The objective lens 24 is capable of focusing, by being moved as appropriate in the approaching direction and the parting direction along the optical axis by the biaxial actuator 28, the laser light L1 on the data recording surface of the optical disc 2 in accordance therewith. In addition, by the objective lens 24 being moved as appropriate in the disc radial direction by the biaxial actuator 28, the irradiation position of the laser light L1 can be adjusted on the track of the data recording surface of the optical disc 2 in accordance therewith.

(Structure of Servo Circuit 6)

Figure 3:
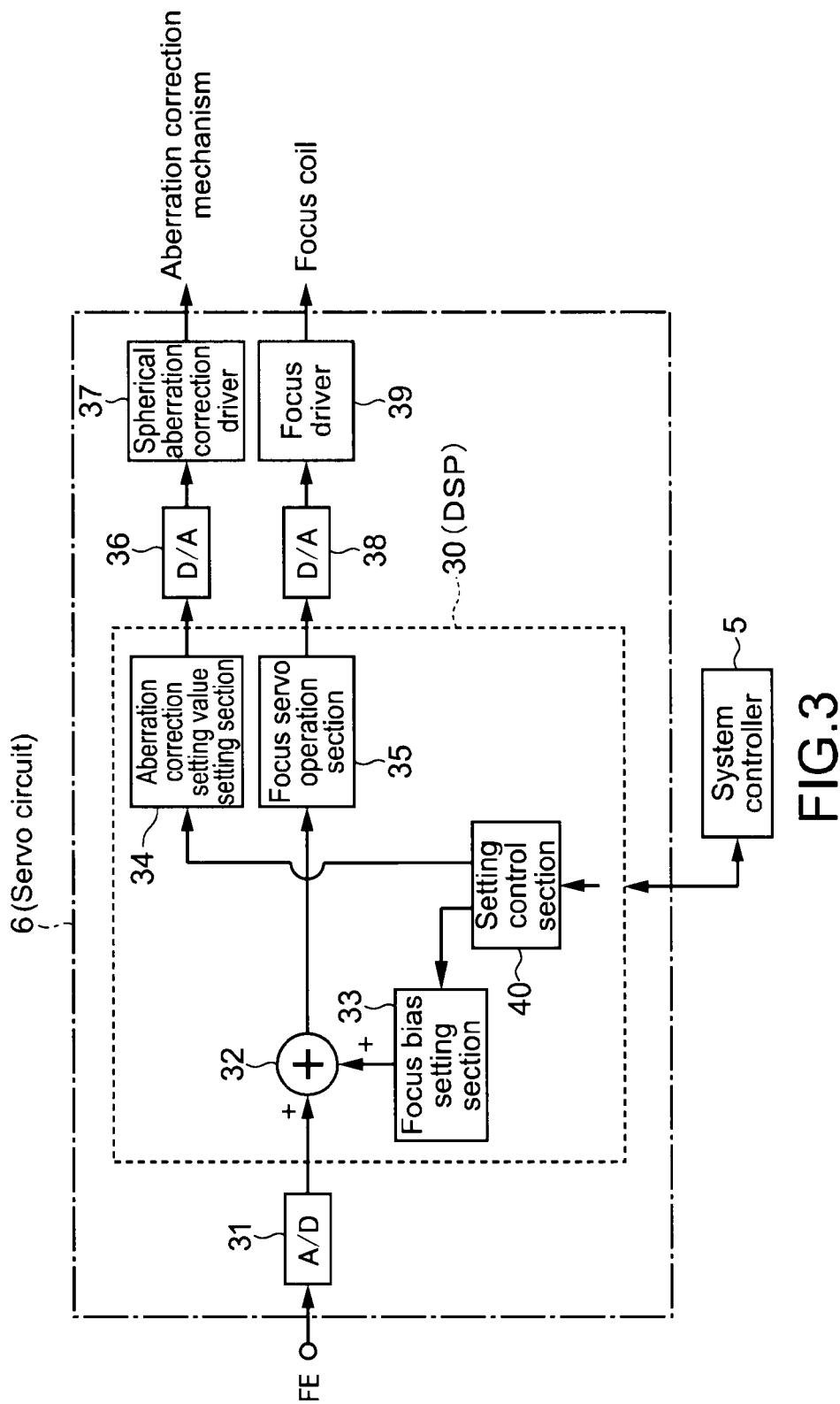
FIG. 3 is a block diagram showing a structure of a servo circuit shown in FIG. 1.

FIG. 3 is a diagram showing a structure of the servo circuit 6. The servo circuit 6 includes a built-in DSP (Digital Signal Processor) 30. Upon receiving an analog focus error signal from the matrix circuit 10, the servo circuit 6 transmits, at a stage before the DSP 30, the focus error signal to the DSP 30 as digital focus error data via an analog/digital converter 31.

The DSP 30 operates under control of the system controller 5 and takes in the focus error data in a focus servo operation section 35 via an adder 32. Accordingly, the DSP 30 generates focus control data by carrying out a predetermined operation such as filtering including a phase compensation or the like and loop gain processing using the focus error data in the focus servo operation section 35.

When the digital focus control data is generated by the DSP 30, the servo circuit 6 transmits, subsequent to the DSP 30, the focus control data to a focus driver 39 as an analog focus control signal via the digital/analog converter 38. Accordingly, the servo circuit 6 transmits the focus control signal to the biaxial actuator 28 (i.e., focus coil) of the optical pickup 3 from the focus driver 39 and drives it. The servo circuit 6 thus moves the objective lens 24 (FIG. 2) along the optical axis in the approaching direction and the parting direction and causes the focal point of the laser light L1 to follow the data recording surface of the optical disc 2.

Provided in the DSP 30 of the servo circuit 6 is an aberration correction setting value setting section 34 that stores correction data for correcting a spherical aberration (hereinafter, referred to as "aberration correction setting value") of the laser light L1 (FIG. 2). When the laser light L1 is irradiated onto the data recording surface of the optical disc 2, the DSP 30 reads out the aberration correction setting value from the aberration correction setting value setting section 34. When the aberration correction setting value is read out from the aberration correction setting value setting section 34 in the DSP 30, the servo circuit 6 transmits, subsequent to the DSP 30, the aberration correction setting value to a spherical aberration correction driver 37 as an analog aberration correction signal via a digital/analog converter 36. Accordingly, the servo circuit 6 transmits the aberration correction signal to the actuator 27 of the optical pickup 3 from the spherical aberration correction driver 37 and drives it. The servo circuit 6 thus moves the movable lens 23A of the spherical aberration correction lens group 23 in the optical-axis direction and corrects the spherical aberration caused in the laser light L1.

Also provided in the DSP 30 of the servo circuit 6 is a focus bias setting section 33 that stores correction data for correcting the position of the objective lens 24 to a desired position (hereinafter, referred to as "focus bias setting value"). When the laser light L1 is irradiated onto the data recording surface of the optical disc 2, the DSP 30 reads out the focus bias setting value from the focus bias setting section 33. By transmitting the focus bias setting value to the adder 32, the DSP 30 adds the focus bias setting value to the focus error data in the adder 32 and transmits the result to the focus servo operation section 35.

In other words, the DSP 30 calculates the focus control data using the focus error data to which the focus bias setting value has been added in the focus servo operation section 35. Then, the servo circuit 6 supplies the focus control data to the biaxial actuator 28 of the optical pickup 3 as the focus control signal.

As described above, the servo circuit 6 is capable of forming the focus servo loop in a state where an error of the focus error signal is canceled out by the focus bias setting value. Therefore, the servo circuit 6 is capable of causing the focal point of the laser light L1 to follow the data recording surface of the optical disc 2 in accordance with cyclical processing of the focus servo loop.

Moreover, a setting control section 40 is provided in the DSP 30 of the servo circuit 6. The setting control section 40 stores an aberration adjustment initial value corresponding to an initial aberration generation amount determined by the system controller 5 at the time of the start-up, and transmits a value obtained by adding an aberration correction value or an evaluation aberration correction value transmitted from the system controller 5 to the stored aberration adjustment initial value to the aberration correction setting value setting section 34 as an aberration correction setting value so that the value is stored therein. Moreover, the setting control section 40 stores a focus bias initial value corresponding to an initial focus bias amount adjustment result determined by the system controller 5 at the time of the start-up, and transmits a value obtained by adding a focus bias value or an evaluation focus bias value transmitted from the system controller 5 to the stored focus bias initial value to the focus bias setting section 33 as a focus bias setting value so that the value is stored therein. It should be noted that at the time of the start-up, the system controller 5 successively determines the focus bias initial value and the aberration adjustment initial value of each of the layers of the optical disc 2 by a well-known method instead of an adjustment method of the present invention, and stores the values in a storage section (not shown) in the DSP 30.

Figure 4:
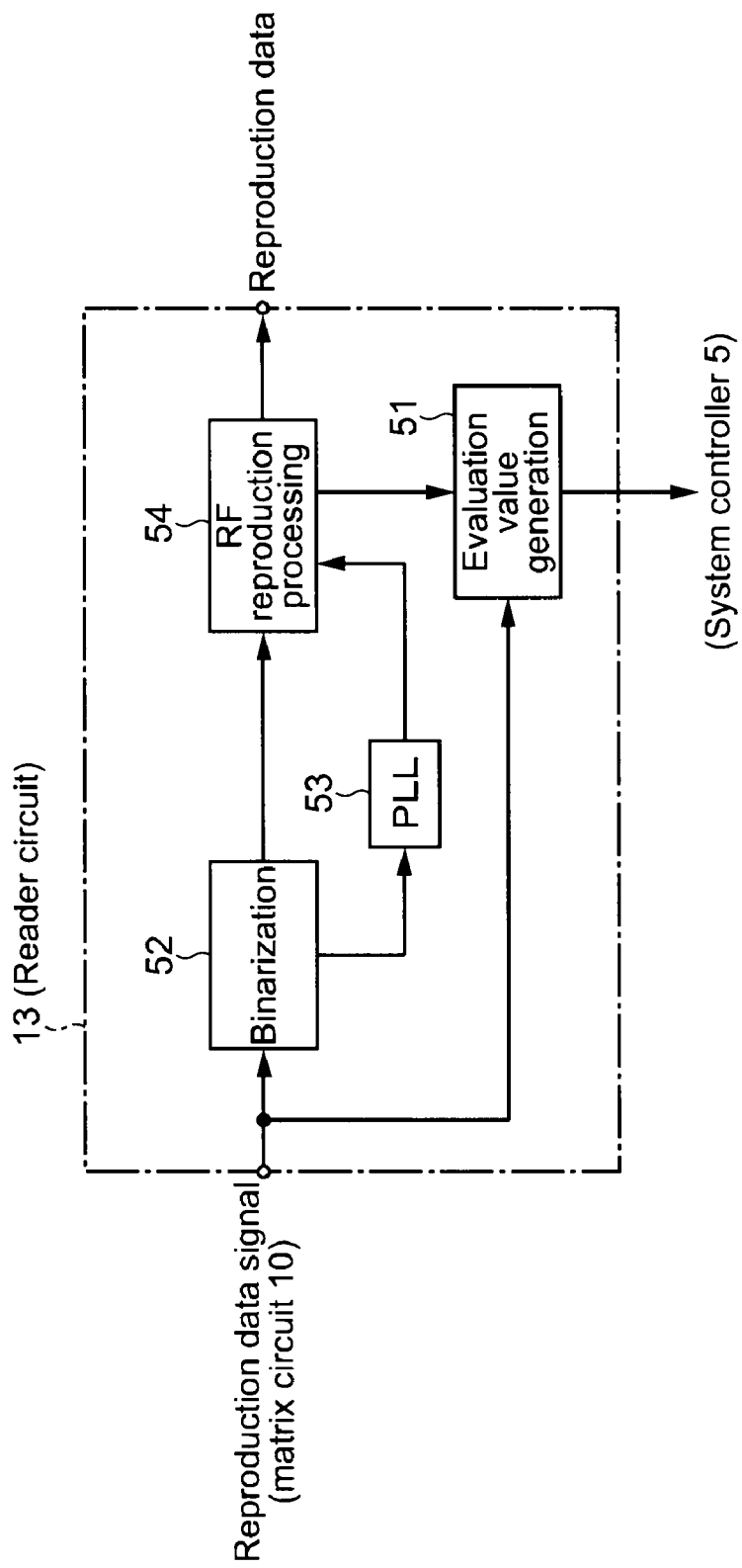
FIG. 4 is a diagram showing a structure of a reader circuit shown in FIG. 1.

FIG. 4 is a diagram showing a structure of the reader circuit 13. The reader circuit 13 includes a binarization circuit 52, a PLL circuit 53, an RF reproduction processing circuit 54, and an evaluation value generation circuit 51. The binarization circuit 52 subjects an RF signal transmitted from the matrix circuit 10 to binarization processing and transmits modulation data obtained as a result of the binarization processing to the demodulation circuit 14. The PLL circuit 53 generates operation clocks for reproduction processing by executing PLL processing using the RF signal. The RF reproduction processing circuit 54 generates data using the operation clocks for reproduction processing generated by the PLL circuit 53 based on the binarization signal obtained by the binarization circuit 52. The evaluation value generation circuit 51 measures a fluctuation component (hereinafter, referred to as jitter) caused along a time axis in the RF signal transmitted from the matrix circuit 10 and transmits a measured jitter measurement signal to the system controller 5 as an evaluation value. The jitter caused in the RF signal is a physical amount that represents a temporal deviation of a transition of information expressing the RF signal. Further, the information expressing the RF signal is information formed on the data recording surface of the optical disc 2 as a pit, for example.

In the optical pickup 3, the pit can be captured more accurately by the laser light L1 as the objective lens 24 comes closer to the desired position and the laser light L1 is more focused on the data recording surface of the optical disc 2. Therefore, as the laser light L1 is more focused on the data recording surface, a value of a jitter caused in the RF signal becomes smaller. On the contrary, in the optical pickup 3, it becomes more difficult to capture the pit by the laser light L1 as the objective lens 24 moves farther away from the desired position and the laser light L1 is brought more out of focus from the data recording surface of the optical disc 2 (i.e., as focal point is brought more out of focus from data recording surface). Therefore, as the laser light L1 is brought more out of focus from the data recording surface, the value of the jitter caused in the RF signal becomes larger.

In the reproducing apparatus 1, an internal temperature rises due to heat radiated by operations of the various circuit blocks, the spindle motor 8, and the like after the start-up. Due to the rise of the internal temperature, a base member of the optical pickup 3 may be stretched and deformed by the heat, with the result that distances among optical components such as a lens and a laser diode held by the base member in the optical pickup 3 are changed. Consequently, an optimal value for the focus bias is changed due to a change of an error caused in the focus error signal, and an optimal value for the aberration correction is also changed due to a change of the aberration generation amount. Particularly when a plastic lens is used for an optical system of the optical pickup 3, a spherical aberration generation amount due to a temperature change becomes larger than that in a case where a glass lens is used.

In this regard, the reproducing apparatus 1 carries out a focus bias adjustment and an aberration adjustment during read so that more-optimal values can be obtained as the focus bias value and the aberration correction value following a change in the internal temperature after the start-up.

(Overall Operation)

Next, an overall operation of the focus bias adjustment and the aberration adjustment will be described.

With an aberration adjustment initial value corresponding to an aberration generation amount adjustment result of a layer x in the optical disc 2 at the time of the start-up of the reproducing apparatus 1 being represented by $A0x$ and a focus bias initial value corresponding to a focus bias amount adjustment result at the time of the start-up being represented by $B0x$, an aberration correction setting value in the layer x can be expressed by $A0x$+aberration correction value, and a focus bias setting value in the layer x can be expressed by $B0x$+focus bias value. Therefore, values to be an adjustment target after the start-up of the reproducing apparatus 1 are the aberration correction value and the focus bias value. Here, the layer x is a recording layer as the adjustment target out of the plurality of recording layers of the optical disc 2. The system controller 5 obtains, at the time of the start-up of the reproducing apparatus 1, the focus bias initial value and the aberration adjustment initial value for each of the recording layers and transmits the values to the setting control section 40 of the servo circuit 6 so that the values are stored in the storage section (not shown) of the DSP 30.

Hereinafter, an operation carried out in a case where the aberration correction value and the focus bias value are adjusted will be described.

The aberration correction value is represented by A, and the focus bias value is represented by B. Initial values of the aberration correction value and the focus bias value at a time an adjustment is started are both 0.

Figure 5:
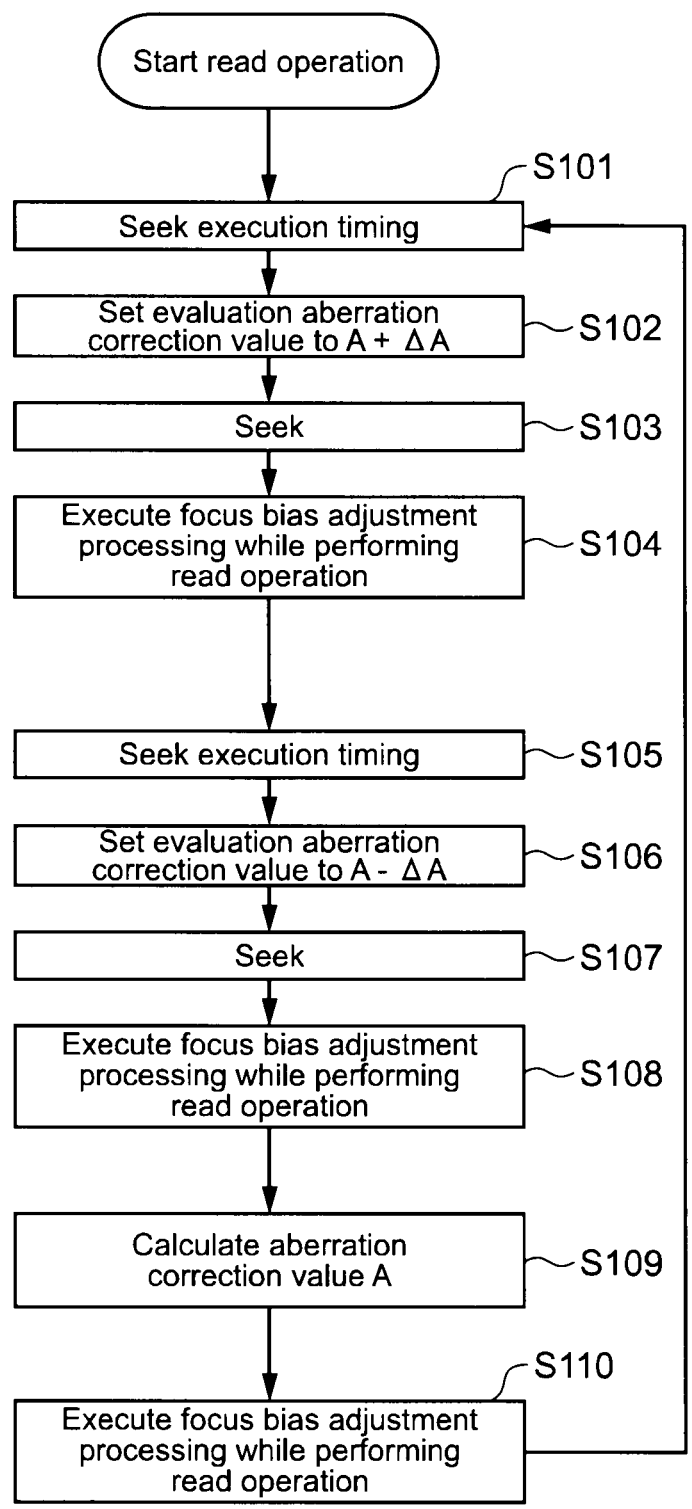
FIG. 5 is a flowchart of an aberration adjustment during read.

FIG. 5 is a flowchart of the aberration adjustment during read.

1. The system controller 5 of the reproducing apparatus 1 judges, upon receiving a read command from the external AV system AVS1, a seek execution timing at which a seek operation is performed for moving the optical pickup 3 in front of a target read start position on the optical disc 2 (Step S101). Upon judging the seek execution timing, the system controller 5 transmits $A+\Delta A$ to the setting control section 40 as the evaluation aberration correction value (Step S102). Here, $\Delta A$ is a change amount given in advance for evaluating the aberration adjustment. Subsequently, the system controller 5 transmits a seek command signal to the servo circuit 6 to execute an actual seek operation (Step S103).

It should be noted that here, although a timing of changing the aberration correction value of the aberration correction setting value setting section 34 is right before executing seek, the aberration correction value of the aberration correction setting value setting section 34 may be changed during the seek operation, for example.

2. At a time the optical pickup 3 is enabled to perform a read operation from the target read start position on the optical disc 2, the system controller 5 executes the read operation while executing the focus bias adjustment (Step S104). The focus bias adjustment will be described later in detail.

3. Data read out from the optical disc 2 and subjected to binarization processing in the reader circuit 13, demodulation processing in the demodulation circuit 14, and decode processing in the decoder 15 is transferred to a buffer inside the decoder 15 to be stored therein. When the buffer becomes full, the mode temporarily shifts from the reproduction mode to the standby mode, and the read operation is resumed thereafter when the data is read out from the buffer and an amount of data stored in the buffer falls below a certain value. Accordingly, the system controller 5 again judges the seek execution timing (Step S105).

4. When the seek execution timing is judged again, the system controller 5 changes the evaluation aberration correction value to A−ΔA (Step S106) and thereafter executes seek (Step S107). At the time the optical pickup 3 is enabled to perform the read operation from the target read start position on the optical disc 2, the system controller 5 executes the read operation while executing the focus bias adjustment (Step S108).

5. After that, the system controller 5 calculates the aberration correction value and sets a result of the calculation to A as a new aberration correction value (Step S109).

6. The system controller 5 executes the focus bias adjustment processing while carrying out the read operation. Upon judging the next seek execution timing, the system controller 5 returns to Step S102 and performs control so as to repeat the same operation starting from the process of changing the evaluation aberration correction value to A+ΔA.

(Focus Bias Adjustment Method During Read)

Next, the focus bias adjustment method will be described.

Figure 6:
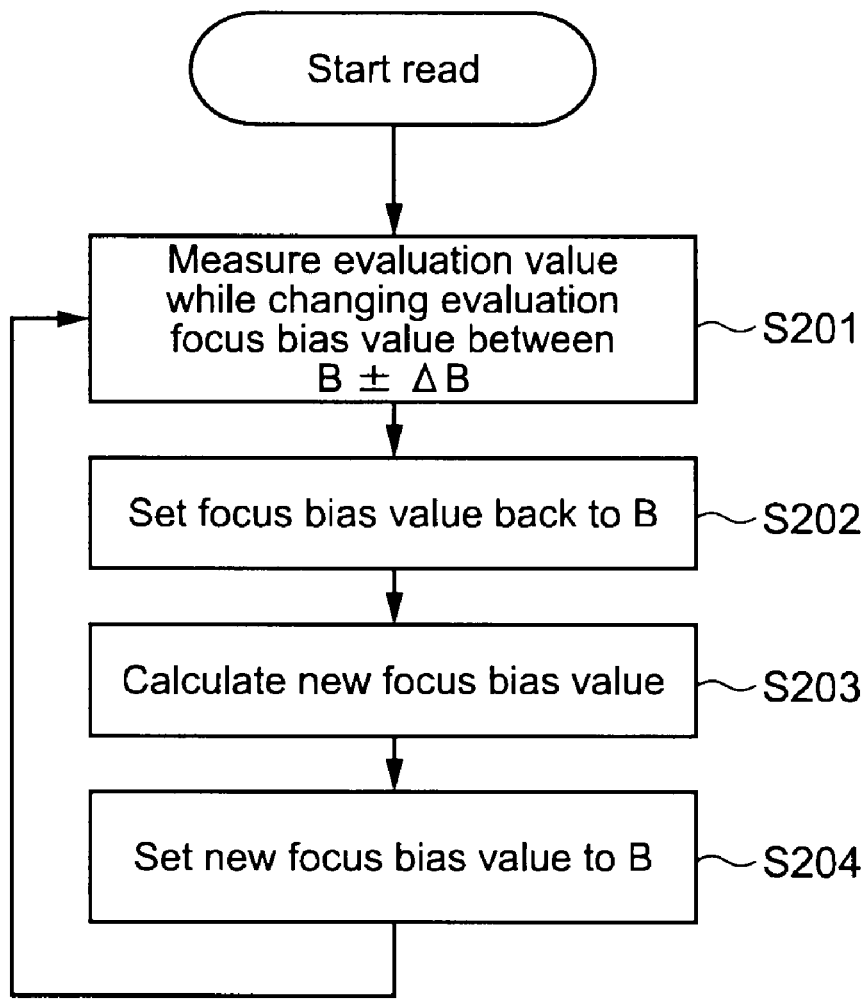
FIG. 6 is a flowchart of a focus bias adjustment during read.
Figure 7:
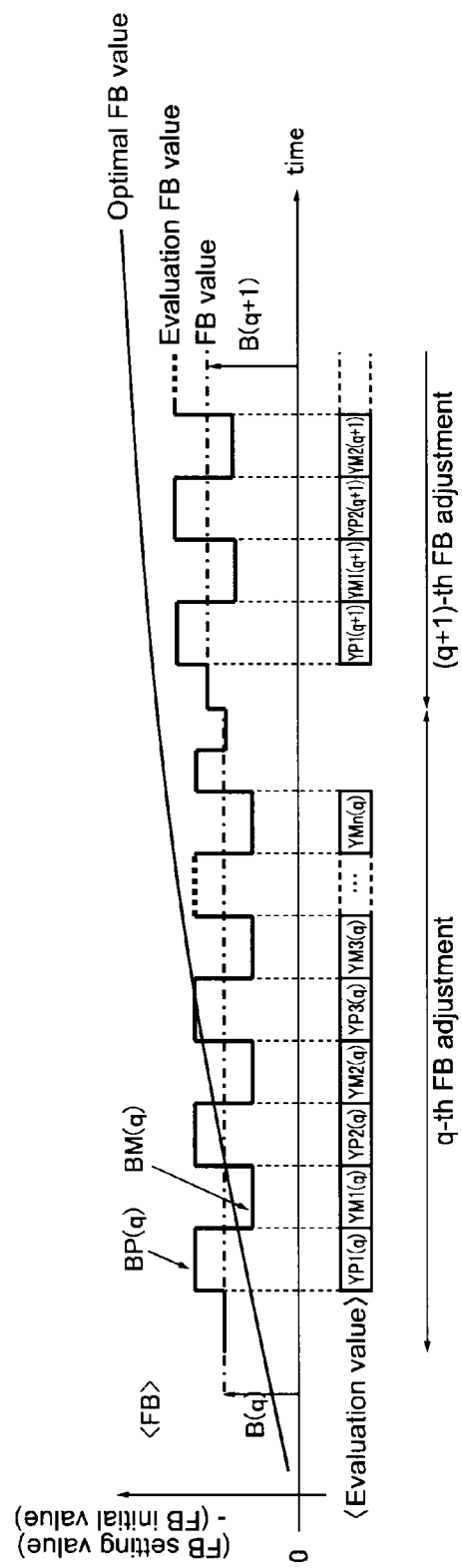
FIG. 7 is an explanatory diagram for the focus bias adjustment.

FIG. 6 is a flowchart of the focus bias adjustment during read, and FIG. 7 is an explanatory diagram for the focus bias adjustment. It should be noted that in FIG. 7, FB represents a focus bias. Moreover, the ordinate axis of FIG. 7 represents a value obtained by subtracting the focus bias initial value from the focus bias setting value, and the abscissa axis represents time.

The current focus bias value at a time of starting a q-th focus bias adjustment is represented by B(q).

As shown in FIG. 7, the system controller 5 performs control so as to execute the read operation while alternately changing information on a focus bias value to be given to the setting control section 40 between BP(q) and BM(q). Here, BP(q) and BM(q) are each referred to as "evaluation focus bias value". BP(q) is B(q)+ΔB, and BM(q) is B(q)−ΔB. ΔB represents a change amount given in advance for evaluating the focus bias adjustment. The system controller 5 acquires, for respective sections in which the evaluation focus bias value is set to be B(q)±ΔB, evaluation values YP1($q$), YM1($q$), YP2($q$), YM2($q$), . . . , YPn(q), and YMn(q) by the evaluation value generation circuit 51.

As described above, the system controller 5 executes, for a predetermined section, processing of collecting the evaluation values in the evaluation focus bias setting sections while alternately changing the evaluation focus bias values between plus and minus based on the focus bias value in certain cycles (Step S201). Here, the predetermined section may be an ECC block unit or a disc rotation cycle, for example. Alternatively, the predetermined section may be other sections determined as appropriate.

At a time the evaluation values of the predetermined section are collected, the system controller 5 temporarily restores the information that is to be given to the setting control section 40 from the evaluation focus bias value to the focus bias value (Step S202) and performs a calculation of the focus bias adjustment based on the evaluation values (Step S203). The calculation of the focus bias adjustment is carried out by the following procedure, for example.

1. An average value of the evaluation values obtained in the sections in which the evaluation focus bias value is set on the plus side of the focus bias value is represented by yp, and an average value of the evaluation values obtained in the sections in which the evaluation focus bias value is set on the minus side of the focus bias value is represented by ym.

Assuming that n sets of evaluation values have been obtained by a measurement of the q-th focus bias adjustment, $$yp(q)=(YP1(q)+YP2(q)+A+YPn(q))/n$$

$$ym(q)=(YM1(q)+YM2(q)+A+YMn(q))/n$$

are established. Furthermore, a differential between yp(q) and ym(q) is expressed as follows.

$$yp(q)=yp(q)-ym(q)$$

2. The system controller 5 calculates a new focus bias value by the following expression.

[Expression 1]

$$u(q) = u(q-1) + K_{1P}\left\{\begin{array}{c}y(q)-\\y(q-1)\end{array}\right\} + K_{1i}T_1\left\{\frac{y(q)+y(q-1)-2y_{target}}{2}\right\} \quad (1)$$

Here, u(q) is a focus bias value that is calculated in the q-th focus bias adjustment and expressed by u(q)=B(q+1), u(q−1) is a focus bias value that is calculated in the (q−1)-th focus bias adjustment and expressed by u(q−1)=B(q), y(q) is an evaluation value differential measured in the q-th focus bias adjustment, y(q−1) is an evaluation value differential measured in the (q−1)-th focus bias adjustment, $y_{target}$ is a target value of the evaluation value differential, $T_1$ is an adjustment interval [s], $K_{1p}$ is proportional gain, and $K_{1i}$ is an integral gain.

Expression 1 corresponds to that obtained by discretizing the following PI controlling expression.

[Expression 2]

$$u(t)=K_{1p}\{y(t)-y_{target}\}+K_{1i}\int\{y(t)-y_{target}\}dt \quad (2)$$

Here, $K_{1p}$ and $K_{1i}$ are adjustment gains and determined so as to satisfy desired performance.

Upon ending the above procedure, the system controller 5 sets the new focus bias value as the calculation result to the next B(q+1) (Step S204). After that, the system controller 5 returns to Step S201 to start a measurement for a (q+1)-th focus bias adjustment and similarly carries out the focus bias adjustment thereafter.

Figure 9:
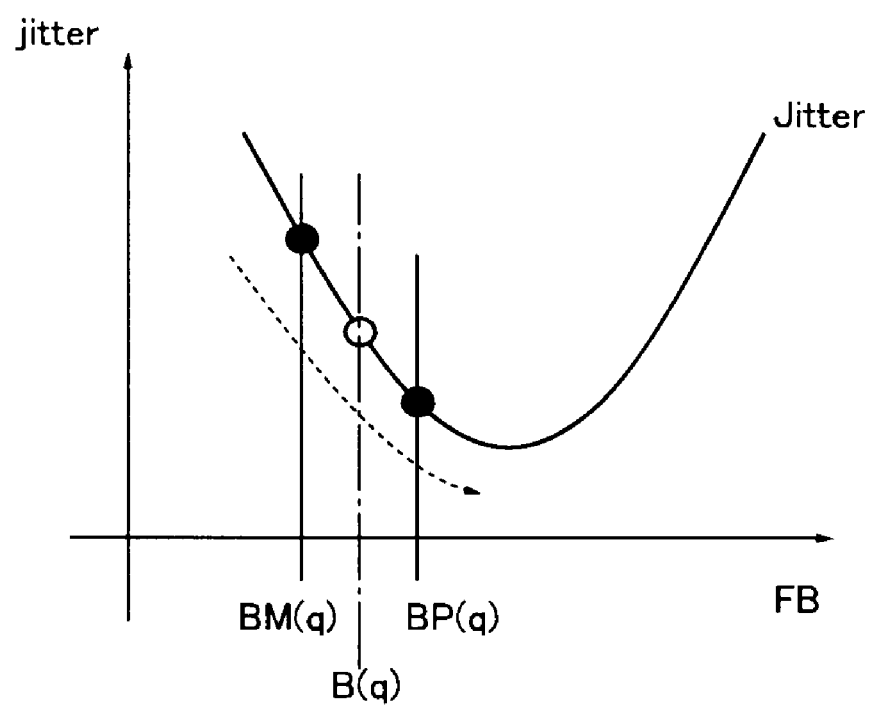
FIG. 9 is a diagram showing a relationship between the focus bias adjustment and an evaluation value in a case where a jitter value is adopted as the evaluation value.

FIG. 9 is a diagram showing a relationship between the focus bias adjustment and the evaluation value in a case where a jitter value is adopted as the evaluation value. The average value yp(q) of the evaluation values obtained in the sections in which the evaluation focus bias value is set on the plus side of the focus bias value and the average value ym(q) of the evaluation values obtained in the sections in which the evaluation focus bias value is set on the minus side of the focus bias value correspond to jitter values indicated by the black dots in FIG. 9. Therefore, if $y_{target}$ is set to 0, a jitter bottom can be adjusted to a target value.

(Aberration Adjustment Method During Read)

Next, an aberration adjustment method during read will be described.

Figure 8:
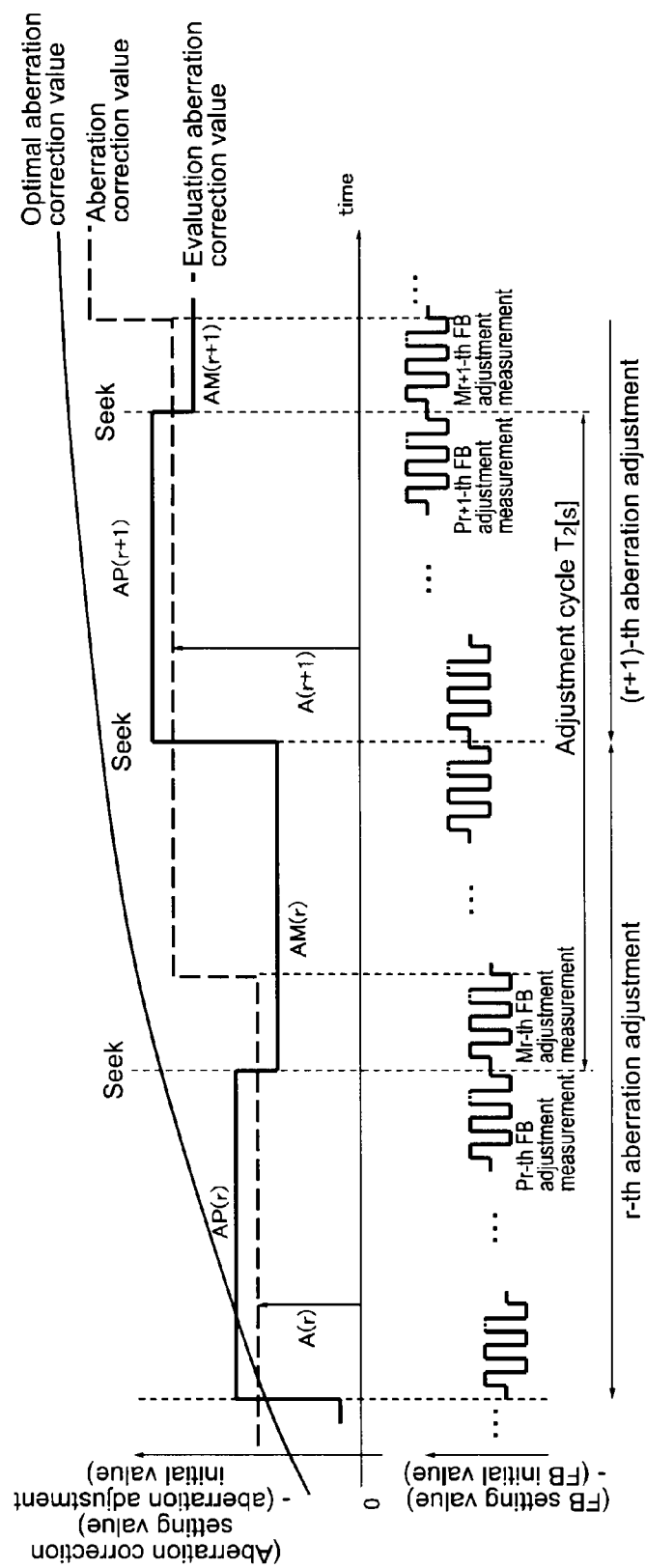
FIG. 8 is an explanatory diagram for the aberration adjustment during read.

As described above in the section (Overall operation) above, the spherical aberration adjustment during read is carried out while alternately changing the information on the focus bias value that is to be given to the setting control section 40 between BP(q) and BM(q). FIG. 8 is an explanatory diagram for the aberration adjustment.

1. The aberration correction value at a time the r-th aberration adjustment is started is represented by A(r). Upon judging the seek execution timing at the time of starting the r-th aberration adjustment, the system controller 5 outputs a control command to the DSP 30 of the servo circuit 6 so that the evaluation aberration correction value is set to be AP(r)= A(r)+ΔA.

2. The system controller 5 executes the focus bias adjustment during read described above in a state where the aberration correction value is set to AP(r).

3. Upon judging the seek execution timing, the system controller 5 outputs a control command to the DSP 30 of the servo circuit 6 so that the evaluation aberration correction value is changed to AM(r)=A(r)−ΔA. For description, the measurement of the focus bias adjustment that has been carried out right before this seek execution timing is assumed to be a Pr-th measurement.

4. In a state where the evaluation aberration correction value is set to AM(r), the system controller 5 executes the focus bias adjustment during read described above. For description, the measurement of the focus bias adjustment carried out for the first time after the evaluation aberration correction value has been set to AM(r) is assumed to be an Mr-th measurement.

5. Upon ending the Mr-th measurement, the system controller 5 executes an aberration adjustment by the following procedure.

(a) An average value of the evaluation values obtained in the Pr-th measurement of the focus bias adjustment is represented by zp(r), and an average value of the evaluation values obtained in the Mr-th measurement of the focus bias adjustment is represented by zm(r).

Specifically, $$zp(r)=(yp(Pr)+ym(Pr))/2$$

$$zm(r)=(yp(Mr)+ym(Mr))/2$$

are established. Furthermore, a differential between zp(r) and zm(r) is set as follows.

$$z(r)=zp(r)-zm(r)$$

(b) The system controller 5 calculates a new aberration correction value by the following expression.

[Expression 3]

$$v(r) = v(r-1) + K_{2P}\left\{\frac{z(r)-}{z(r-1)}\right\} + K_{2i}T_2\left\{\frac{z(r)+z(r-1)-2z_{target}}{2}\right\} \quad (3)$$

Here, v(r) is an aberration correction value that is calculated in the r-th aberration adjustment and expressed by v(r)= A(r+1), v(r−1) is an aberration correction value that is calculated in the (r−1)-th aberration adjustment and expressed by v(r−1)= A(r), z(r) is an evaluation value differential measured in the r-th aberration adjustment, z(r−1) is an evaluation value differential measured in the (r−1)-th aberration adjustment, $z_{target}$ is a target value of the evaluation value differential, $T_2$ is an adjustment interval [s], $K_{2p}$ is proportional gain, and $K_{2i}$ is an integral gain.

Expression 3 corresponds to that obtained by discretizing the following PI controlling expression.

[Expression 4]

$$v(t)=K_{2p}\{z(t)-z_{target}\}+K_{2i}\int\{z(t)-z_{target}\}dt \quad (4)$$

Here, $K_{2p}$ and $K_{2i}$ are adjustment gains and determined so as to satisfy desired performance.

6. Upon ending calculation by the above procedure, the system controller 5 executes the focus bias adjustment described above in a state where the evaluation aberration correction value is set to AM(r).

7. When the seek execution timing occurs, the system controller 5 sets the evaluation aberration correction value to be AP(r+1)=A(r+1)+ΔA and similarly carries out the adjustment thereafter.

Figure 10:
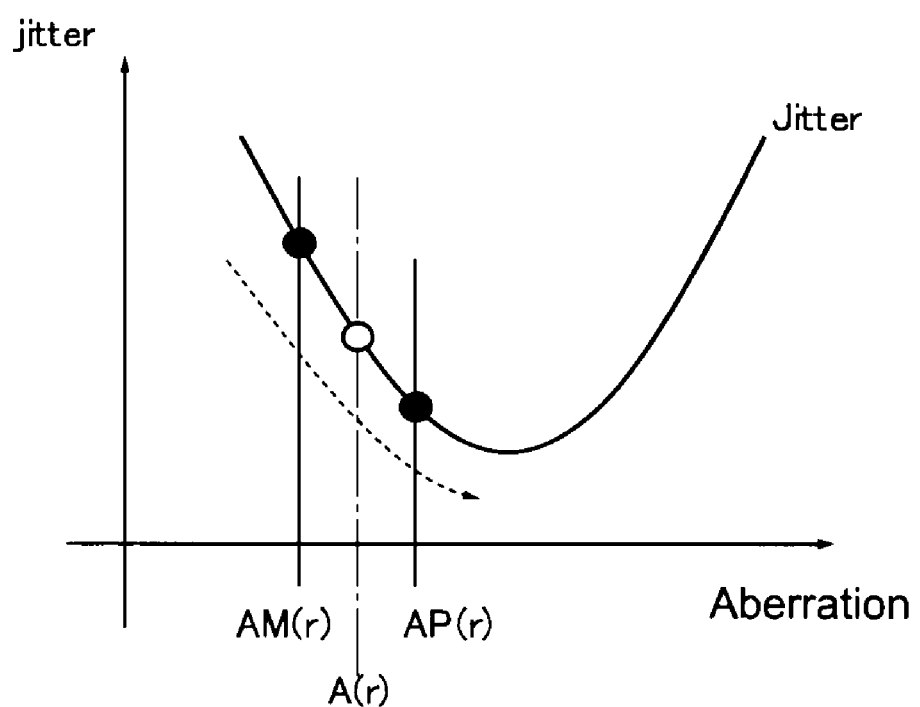
FIG. 10 is a diagram showing a relationship between the aberration adjustment and the evaluation value in the case where a jitter value is adopted as the evaluation value.

FIG. 10 is a diagram showing a relationship between the aberration adjustment and the evaluation value in the case where a jitter value is adopted as the evaluation value. The average value zp(r) of the evaluation values obtained in the sections in which the evaluation aberration correction value is set on the plus side of the aberration correction value and the average value zm(r) of the evaluation values obtained in the sections in which the evaluation aberration correction value is set on the minus side of the aberration correction value correspond to jitter values indicated by the black dots in FIG. 10. Therefore, if $z_{target}$ is set to 0, a jitter bottom can be adjusted to a target value.

According to this embodiment, by carrying out the focus bias adjustment and the aberration adjustment during read, optimal values can be obtained as the focus bias value and the aberration correction value following a change of the internal temperature after the start-up, and the focus bias adjustment and the aberration adjustment can thus be carried out favorably. In addition, according to this embodiment, since an integration effect of the evaluation values is imparted to the calculations of the focus bias adjustment and the aberration adjustment and an effect of a measurement error of a jitter value is thus reduced as much as possible, an amplitude during an adjustment operation and an effect of the adjustment operation on read performance can be reduced.

Next, a modified example of the above embodiment will be described.

Modified Example 1

Processing of Adjustment Calculation for Enhancing Adjustment Accuracy

Figure 11:
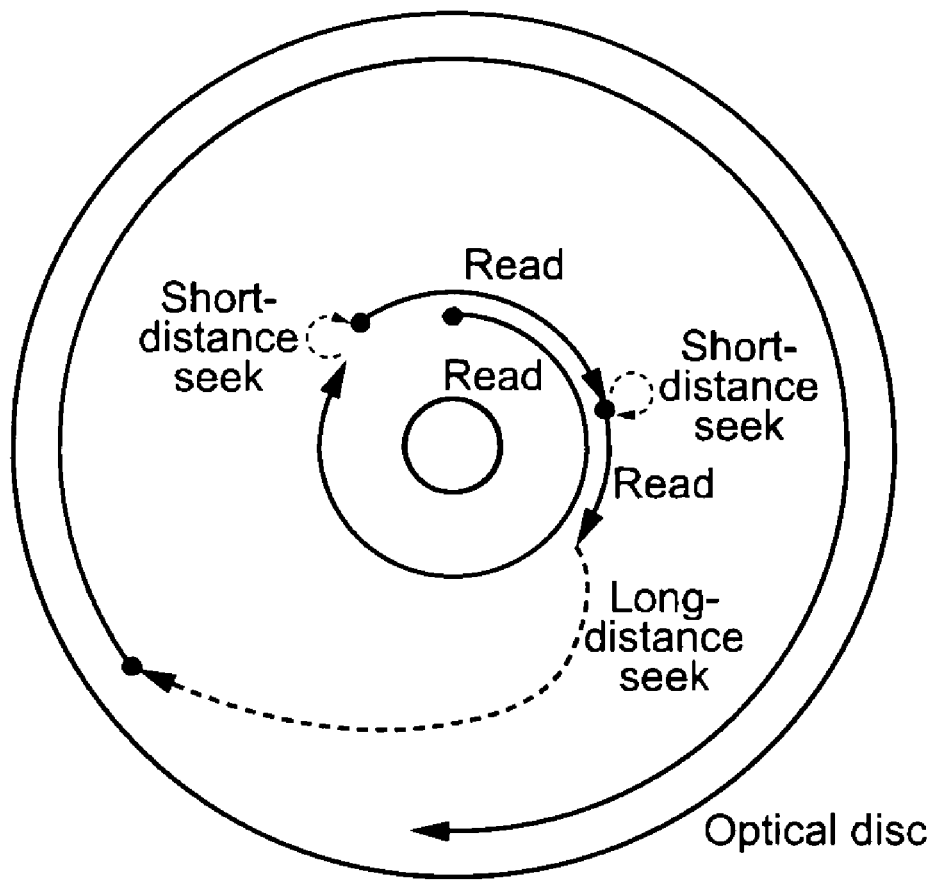
FIG. 11 is a diagram for explaining a distance in a disc radial direction before and after seek.

An optical value of the aberration correction differs depending on the position within the optical disc surface. For example, when a spherical aberration is selected as an adjustment item, an optimal value of the aberration correction differs depending on a thickness of a protective layer of the optical disc. A difference between the thicknesses of the protective layer of the optical disc at positions before and after seek is normally considered to be relatively small in short-distance seek as shown in FIG. 11, but in long-distance seek, the difference between the thicknesses of the protective layer of the optical disc may become large since physical positions are distant from each other. In other words, a difference between the optimal values of the aberration correction may become large.

Figure 12:
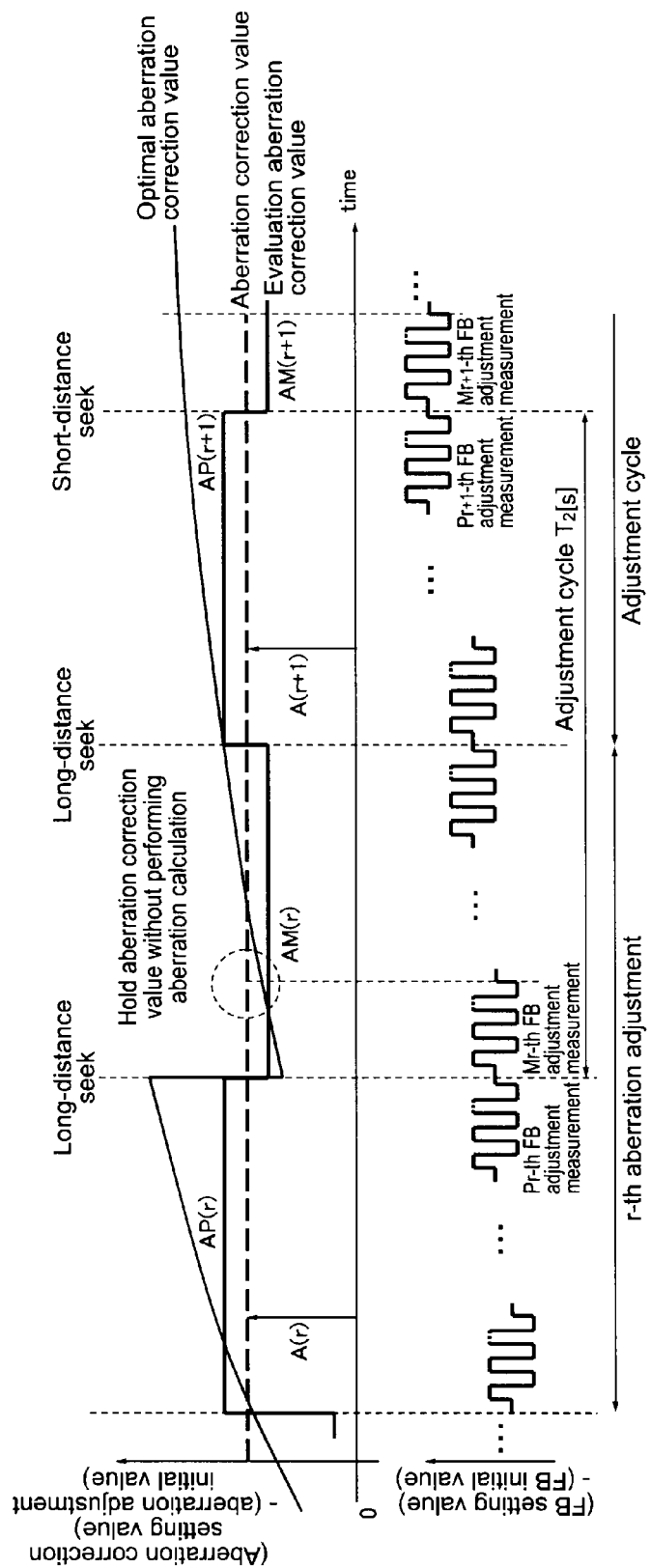
FIG. 12 is an explanatory diagram of aberration adjustment processing in long-distance seek.

In this regard, as shown in FIG. 12, in a case where seek at a time the evaluation aberration correction value is switched from AP(r) to AM(r) is long-distance seek, the system controller 5 holds the aberration correction value without performing a calculation a predetermined number of times at an initial stage of the aberration adjustment. FIG. 12 shows an example in which the aberration correction value is held without r-th and (r+1)-th calculations of the aberration adjustment being performed. In other words, A(r+1)=A(r+2)=A(r) is established.

By the way, a judgment on the long-distance seek and the short-distance seek only needs to be made as follows. That is, seek is judged to be the long-distance seek when a movement amount in the disc radial direction in the seek is a certain value or more and judged to be the short-distance seek when the movement amount is smaller than the certain value, for example.

Modified Example 2

Processing in Case where Seek at Time Evaluation Aberration Correction Value is Changed from Plus to Minus Crosses Layers When seek at a time the evaluation aberration correction value switches from AP(r) to AM(r) crosses layers, optimal values of the aberration correction by a temperature change may differ before and after the seek. In this case, it is desirable to carry out processing that is the same as that of Modified Example 1. Specifically, when the seek at the time the evaluation aberration correction value switches from AP(r) to AM(r) crosses layers, the system controller 5 holds the aberration correction value without performing a calculation a predetermined number of times at the initial stage of the aberration adjustment.

Modified Example 3

Processing of Focus Bias Adjustment Calculation Right after Change of Evaluation Aberration Correction Value For measuring evaluation values y(q−1) and y(q) of the focus bias adjustment under the same aberration condition, in the calculation of the focus bias adjustment shown in Expression 1, it is desirable to hold the focus bias value without performing the first calculation right after the change of the aberration setting.

Figure 13:
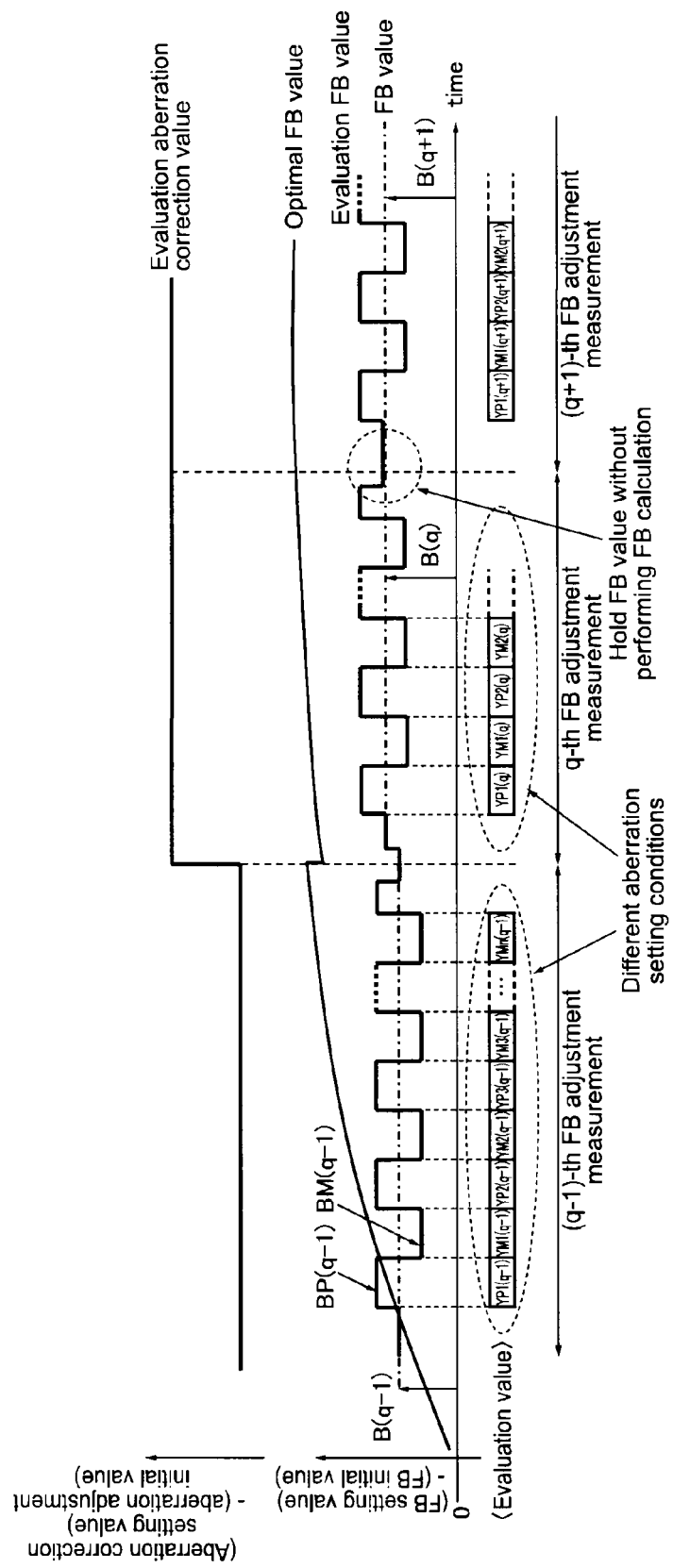
FIG. 13 is a diagram for explaining a change of an aberration correction value during the focus bias adjustment.

For example, when the evaluation aberration correction value is changed between the (q−1)-th focus bias adjustment and the q-th focus bias adjustment as shown in FIG. 13, the aberration condition differs for the evaluation values y(q−1) and y(q). In this regard, the system controller 5 holds the focus bias value without performing the calculation of the q-th focus bias adjustment and sets B(q+1)=B(q).

Modified Example 4

Effect of Focus Bias Adjustment on Aberration Adjustment Accuracy

Figure 14:
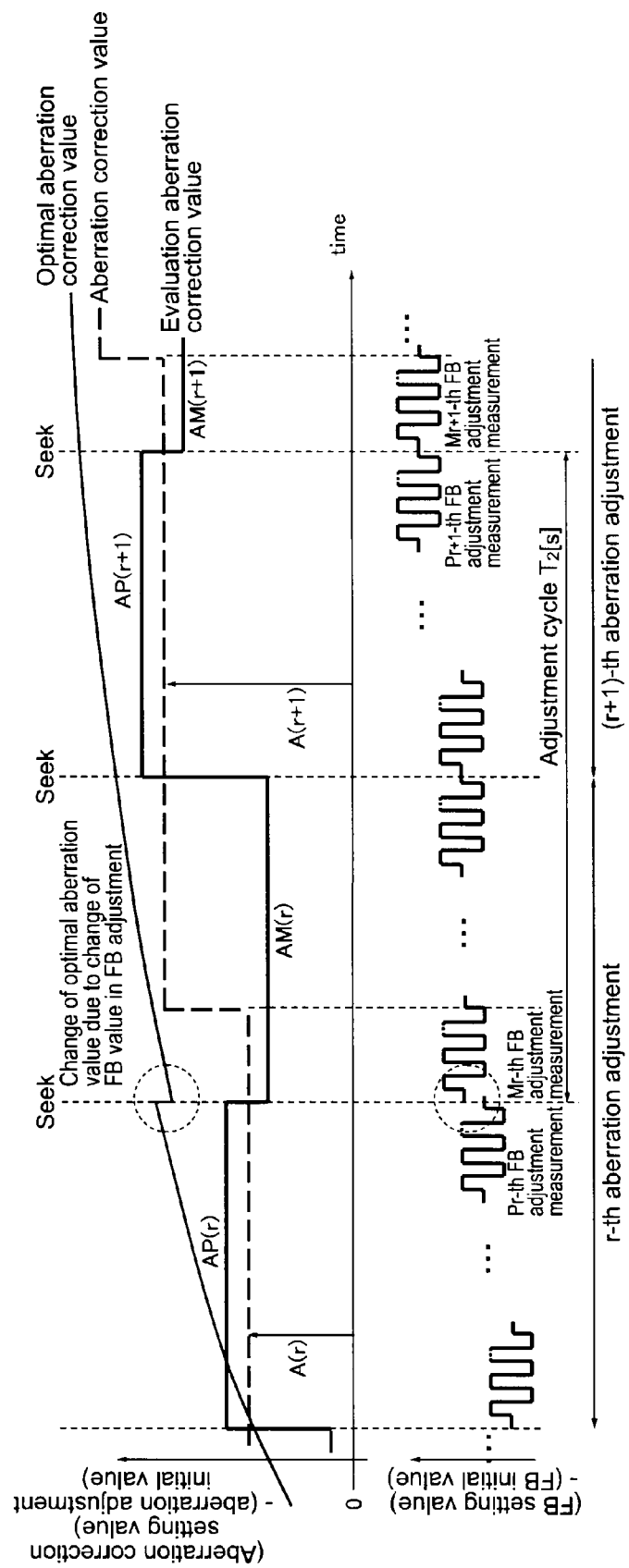
FIG. 14 is a diagram for explaining an effect of the focus bias adjustment on aberration adjustment accuracy.

As shown in FIG. 14, in a case where a focus bias adjustment amount in the Pr-th focus bias adjustment is large in obtaining the evaluation values zp(r) and zm(r) of the aberration adjustment, a fluctuation of an optimal aberration value becomes large due to a difference in the focus bias conditions to thus effect the aberration adjustment accuracy. For removing such an effect, the system controller 5 does not perform a calculation for the Pr-th focus bias adjustment and holds the previous focus bias value, that is, sets B(Mr)=B(Pr). It should be noted that in a case where a focus bias adjustment cycle is sufficiently shorter than an aberration adjustment cycle and a focus bias adjustment amount in one focus bias adjustment calculation is small, the effect of the focus bias adjustment on the aberration adjustment accuracy is negligible. Therefore, the processing may be omitted.

Modified Example 5

Evaluation Value and Target Value of Evaluation Value Differential

The above embodiment has described the case of using a jitter value as the evaluation value. However, the present invention is not limited thereto, and an amplitude value of an RF signal or an amplitude value of a wobble signal may be used as the evaluation value, for example. Moreover, in the reproducing apparatus 1, it is possible to obtain, after an RF signal is subjected to an analog/digital conversion, data to be reproduced by signal processing in which partial response equalization processing called PRML (Partial Response Maximum-Likelihood) and maximum-likelihood decode processing such as Viterbi decoding are combined, and use an MLSA (Maximum Likelihood Sequence Amplitude) as an error index of the PRML or a PRSNR (Partial Response Signal to Noise Ratio) as a quality evaluation index of the PRML as the evaluation value. In addition, in the reproducing apparatus 1, it is also possible to obtain a likelihood difference of a path with a minimum Euclidean distance in the maximum-likelihood decoding included in the PRML signal processing and use a reproduction error rate (DMj) generated under an adjustment condition determined by subjecting the likelihood difference to statistical processing as the evaluation value.

When using the evaluation value described above, by setting the target values of both the evaluation value differentials $y_{target}$ and $z_{target}$ to 0, the focus bias value and the aberration correction value can be adjusted to optimal values.

In the adjustments during read (reproduction mode) and idling (standby mode), any of the evaluation values described above can be used. When performing the adjustment during write, a wobble amplitude signal can be used as the evaluation value.

Modified Example 6

Adjustment Method that Takes into Account Durability of Aberration Correction Mechanism As an aberration correction mechanism, there are a method that uses a liquid crystal device for an aberration correction, a method of driving an aberration correction lens to perform a correction, and the like. Particularly in the case of driving an aberration correction lens, it may be better to restrict an aberration adjustment frequency from a viewpoint of mechanical drive durability. As a restriction method in this case, the following methods are conceivable.

1. After an elapse of a certain time period since start-up, an aberration adjustment operation is stopped.

By this method, it is possible to follow an aberration change due to a temperature rise in the reproducing apparatus 1 right after the start of the operation. In general, the internal temperature of the reproducing apparatus 1 rises due to heat radiated by the various circuit blocks, the spindle motor 8, and the like of the reproducing apparatus 1 right after the start of the operation. However, since an ascending curve of the temperature becomes gentle after a while and the aberration generation amount by the temperature change becomes small, performance can be maintained even without performing the aberration adjustment. It should be noted that when the internal temperature of the reproducing apparatus 1 is fluctuated due to a temperature change outside the reproducing apparatus 1 after the aberration adjustment operation is stopped, the generated aberration cannot be adjusted.

2. An average cycle of changing an aberration correction value is controlled to be a certain value or more.

The descriptions heretofore have described the method of changing an evaluation aberration correction value every time a seek execution timing occurs during read. In contrast, as shown in FIG. 15, it is also possible to insert processing that "skips a process of changing an evaluation aberration correction value a plurality of times within a certain time period" and restrict the average cycle of changing the evaluation aberration correction value to be a certain value or more. By this method, it is possible to take into account the durability of the aberration correction mechanism while constantly causing the aberration adjustment to operate.

Figures 15A, 15B:
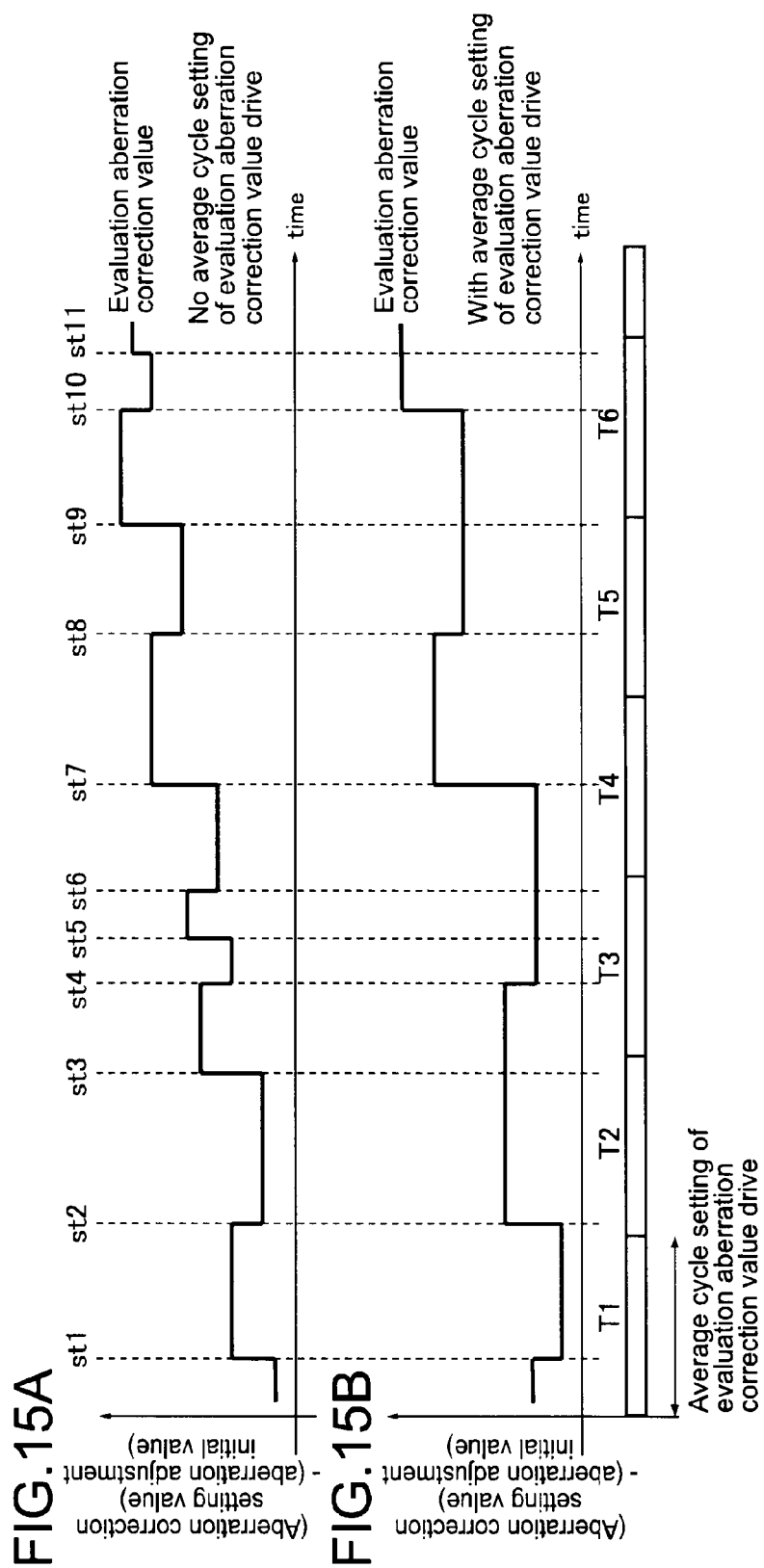
FIG. 15 are diagrams for explaining a setting of an average cycle of an aberration correction drive.

FIG. 15 are explanatory diagrams of this method. FIG. 15A shows a change of the evaluation aberration correction value in a case where the processing of this method is not adopted, and FIG. 15B shows a change of the evaluation aberration correction value in a case where the processing of this method is adopted. Here, T1, T2, T3, . . . are common durations determined for restricting the cycle of changing the evaluation aberration correction value. Assuming that the seek execution timing has occurred at timings st1, st2, st3, . . . , and st11, the evaluation aberration correction value is changed at all the seek execution timings st1, st2, st3, . . . , and st11 as shown in FIG. 15A when the processing is not adopted. On the other hand, the evaluation aberration correction value is not changed at the seek execution timings st3, st5, st6, st9, and st11 as shown in FIG. 15B when the processing is adopted. As described above, by adopting the processing, the cycle of changing the evaluation aberration correction value can be restricted, and durability of the aberration correction mechanism can be taken into account while constantly causing the aberration adjustment to operate.

3. After start-up, an evaluation aberration correction value is changed at every seek execution timing during a predetermined time period, and after an elapse of the predetermined time period, an average cycle of changing the evaluation aberration correction value is set to be a certain time period or more. Specifically, this method is obtained by combining the method of 1. and the method of 2. described above. By this method, it is possible to readily follow the aberration change due to a rise of the internal temperature of the reproducing apparatus 1 right after the start-up by frequent adjustment operations and execute the aberration adjustment at a frequency that takes into account the durability when the temperature change is settled and the aberration change becomes gradual.

4. A necessity of an aberration adjustment is judged based on a quality of an evaluation value, and an aberration adjustment operation is executed only when necessary. Specifically, the aberration adjustment operation is executed only when an evaluation value obtained by the focus bias adjustment, such as a jitter value, is deteriorated a certain level or more. By this method, unnecessary adjustment operations can be avoided.

5. An aberration adjustment operation is executed only when a temperature change is large based on a temperature measurement result. An internal temperature of the reproducing apparatus 1 is measured using a thermistor, and the aberration adjustment operation is executed when a temperature change of a predetermined value or more is detected after the previous adjustment. The aberration adjustment is not executed when the internal temperature of the reproducing apparatus 1 is hardly changed. By this method, unnecessary adjustment operations can be avoided while correcting an aberration caused by the temperature change.

6. An aberration adjustment cycle is made variable in accordance with a magnitude of an evaluation value differential. The aberration adjustment cycle is prolonged when the magnitude of the evaluation value differential (absolute value of z(r)) becomes equal to or smaller than a first value determined in advance, and the aberration adjustment cycle is shortened when the magnitude of the evaluation value differential (absolute value of z(r)) exceeds a second value determined in advance. At this time, the aberration adjustment cycle is changed by the method of 2. described above.

Modified Example 7

Regarding Improvement of Defect Durability

Adjustment accuracies of the focus bias adjustment and the aberration adjustment described heretofore may be lowered due to an effect of a defect that exists in a data recording area of the optical disc 2 during reproduction. For improving defect durability, a defect component of each adjustment value only needs to be removed by performing an LPF (Low Pass Filter) calculation on an output of each value calculated by Expressions (1) and (3) above.

Modified Example 8

Setting of Focus Bias Setting Value and Aberration Correction Setting Value after Inter-Layer Movement after Start-Up When an inter-layer movement of a read position occurs during read or the like after start-up, for example, the system controller 5 sets in the focus bias setting section 33 a sum of a latest focus bias value before the inter-layer movement of the read position and a focus bias initial value of a movement destination layer that has been obtained at a time of start-up of the reproducing apparatus 1 and stored in the storage section (not shown) of the DSP 30. Similarly, the system controller 5 sets in the aberration correction setting value setting section 34 a sum of a latest aberration correction value before the inter-layer movement of the read position and a aberration adjustment initial value of the movement destination layer that has been obtained at the time of the start-up of the reproducing apparatus 1 and stored in the storage section (not shown) of the DSP 30. After that, an adjustment of the focus bias value and the aberration correction value is started in the movement destination layer. As a result, the focus bias adjustment and the aberration adjustment can be carried out favorably from right after the inter-layer movement of the read position.

Other Modified Examples

The embodiment described heretofore has described the case where the focus bias value is adjusted based on Expression (1) above. However, the present invention is not limited thereto, and it is also possible to adjust, every time a latest evaluation value is obtained, the focus bias value using the evaluation value instead of using the q-th and (q−1)-th evaluation values if measurement accuracy of a jitter value is markedly high, for example. Similarly, it is possible to perform, every time the latest evaluation value is obtained, the aberration adjustment using the evaluation value instead of using the r-th and (r−1)-th evaluation values.

Further, in the above embodiment, the system controller 5 stores the calculated focus bias value and aberration correction value in a built-in storage section and uses the values to perform the following adjustment calculation. As a modified example of this part, it is possible to provide a storage section that stores the focus bias value and the aberration correction value calculated by the system controller 5 in the DSP 30 of the servo circuit 6 and read out the focus bias value and the aberration correction value from the DSP 30 of the servo circuit 6 every time the system controller 5 executes the focus bias and aberration adjustment calculations.

Furthermore, the above embodiment has described the case of executing the focus bias adjustment and the aberration adjustment during read. However, the present invention is not limited thereto, and the focus bias adjustment and the aberration adjustment may be similarly carried out during idling.

Moreover, the above embodiment has described the case where the present invention is applied to the reproducing apparatus 1. However, the focus bias adjustment and the aberration adjustment may be executed during at least one of read, idle, and write in a recording/reproducing apparatus.

The above embodiment has described the case of adjusting a spherical aberration of laser light. However, the present invention is not limited to a spherical aberration and is also applicable to an adjustment of various other aberrations caused in the laser light.

Second Embodiment

This embodiment relates to a reproducing apparatus that carries out a tilt adjustment of an optical disc in a radial direction together with the focus bias adjustment and the aberration adjustment in real time.

Figure 16:
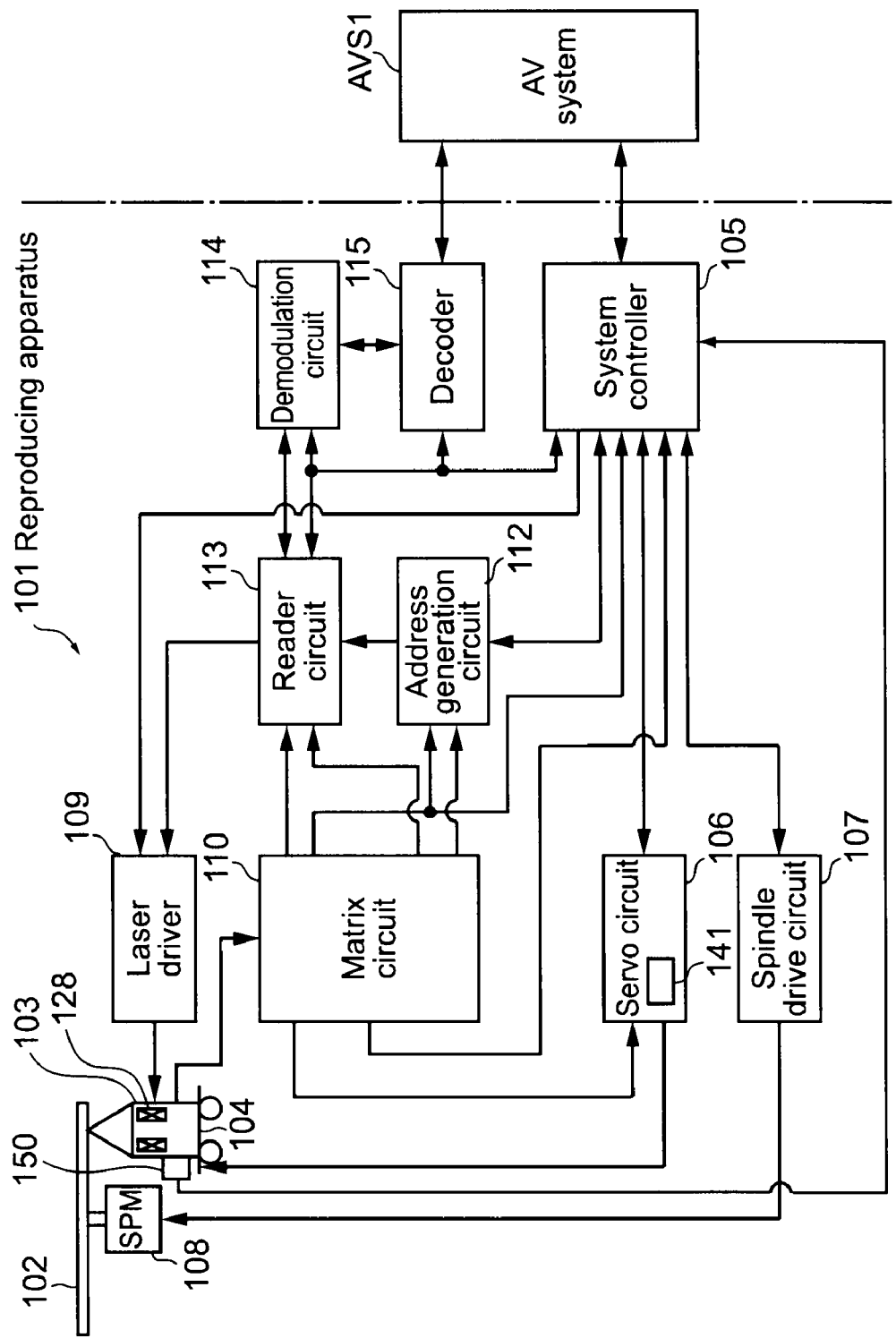
FIG. 16 is a block diagram showing hardware of a reproducing apparatus according to a second embodiment of the present invention.

FIG. 16 is a block diagram showing hardware of a reproducing apparatus according to a second embodiment of the present invention. It should be noted that in the figure, parts corresponding to those of FIG. 1 are denoted by corresponding reference numerals on the 100's, and descriptions on overlapping parts will be omitted as appropriate. In a reproducing apparatus 101 of this embodiment, at least an optical pickup 103, a servo circuit 106, and a system controller 105 differ from those of FIG. 1.

(Structure of Optical Pickup 103)

Figure 17:
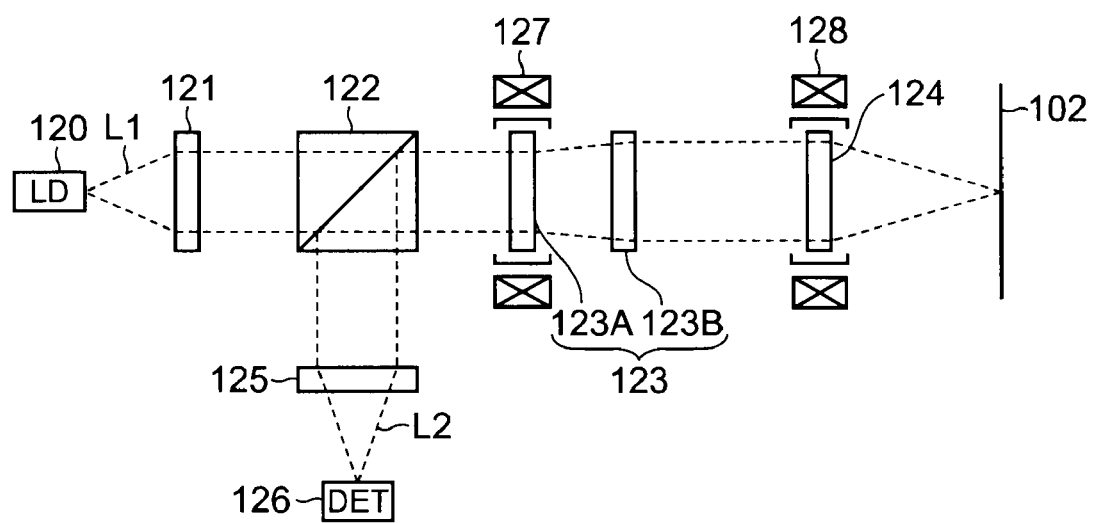
FIG. 17 is a diagram showing a structure of an optical pickup shown in FIG. 16.

FIG. 17 is a diagram showing a structure of the optical pickup 103 shown in FIG. 16. Here, an objective lens 124 is held by a triaxial actuator 128 while being movable in an optical-axis direction (focus direction), a disc radial direction (tracking direction), and a tilt direction. The tilt direction used herein refers to a tilt direction in the radial direction of the optical disc, that is, a direction about an axis in the focus direction and a tangential direction orthogonal to the tracking direction.

The triaxial actuator 128 is constituted of, for example, a plurality of tracking coils and four focus coils. The focus coils are arranged at two positions deviated only an equal distance in a + direction and a − direction of the tracking direction from an optical-axis position of the objective lens 124 and opposed to each other while sandwiching the objective lens 124 in the tangential direction. Here, the two focus coils opposing each other while sandwiching the objective lens 124 in the tangential direction will be referred to as "drive focus coil pair". In other words, two drive focus coil pairs are provided in the optical pickup 103. The objective lens 124 is driven in the focus direction by two drive forces in the focus direction generated by the two drive focus coil pairs. In addition, a drive force in the tilt direction is imparted to the objective lens 124 by providing a differential between the two drive forces in the focus direction generated by the two drive focus coil pairs.

It should be noted that in the above description, the tilt direction has been the direction about the axis in the focus direction and the tangential direction orthogonal to the tracking direction. However, the present invention is not limited thereto, and the tilt direction only needs to be a direction in which the optical axis of the objective lens 124 is tilted with respect to a plane orthogonal to the focus direction.

Moreover, although the drive force for the tilt adjustment has been generated by the differential between the drive forces generated by the two drive focus coil pairs, a dedicated coil for generating a drive force in the tilt direction may be used instead.

In the optical pickup 103 shown in FIG. 17, parts other than the triaxial actuator 128 are the same as those of FIG. 2. Furthermore, a temperature sensor 150 may be provided in the optical pickup 103. A result of a temperature detection by the temperature sensor 150 is supplied to the system controller 105.

(Structure of Servo Circuit 106)

Figure 18:
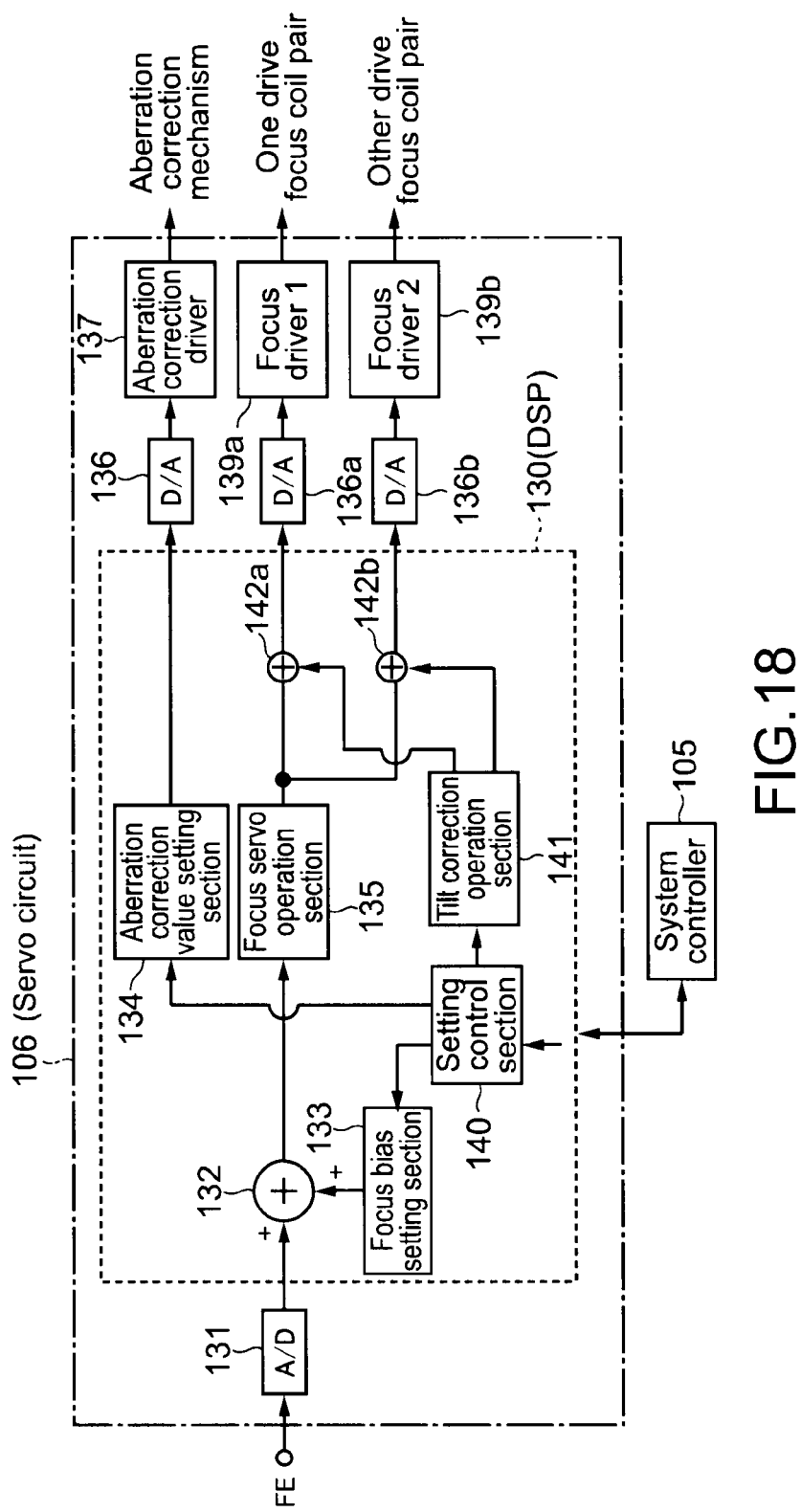
FIG. 18 is a diagram showing a structure of a servo circuit shown in FIG. 16.

FIG. 18 is a diagram showing a structure of the servo circuit 106. In the servo circuit 106, digital focus control data generated by a focus servo operation section 135 is commonly supplied to two adders 142*a* and 142*b*. Outputs of the adders 142*a* and 142*b* are converted into analog focus control signals by digital/analog converters 136*a* and 136*b* and transmitted to two focus drivers 139*a* and 139*b*, respectively. The focus drivers 139*a* and 139*b* amplify the analog focus control signals and transmit them to the drive focus coil pairs of the triaxial actuator 128 in the optical pickup 103. Accordingly, the objective lens 124 is driven along the optical axis, and the focal point of the laser light L1 is caused to follow a data recording surface of an optical disc 102.

A tilt correction operation section 141 is also provided in the servo circuit 106. A setting control section 140 transmits a tilt adjustment value transmitted from the system controller 105 to the tilt correction operation section 141 as a tilt setting value. Based on the tilt setting value transmitted from the setting control section 140, the tilt correction operation section 141 calculates differential data to be imparted to the two pieces of digital focus control data and outputs them to the adders 142*a* and 142*b*. In each of the adders 142*a* and 142*b*, the differential data transmitted from the tilt correction operation section 141 is added to the digital focus control data generated by the focus servo operation section 135. Accordingly, two focus control signals to each of which a differential corresponding to the tilt setting value has been added are output to the focus drivers 139*a* and 139*b* to be supplied to the two drive focus coil pairs of the triaxial actuator 128. Thus, the objective lens 124 is driven in the tilt direction, and a tilt correction is carried out.

It should be noted that it is also possible to correct a spherical aberration caused in the laser light L1 by moving a movable lens 123A of a spherical aberration correction lens group 123 (FIG. 17) in the optical-axis direction in the servo circuit 106. Since the structure for the spherical aberration correction is the same as that of the first embodiment, descriptions thereof will be omitted.

In the reproducing apparatus 101 of this embodiment, the tilt adjustment in real time (hereinafter, referred to as "real-time tilt adjustment") is carried out together with the focus bias adjustment and the aberration adjustment described in the first embodiment.

Meanings of variables used in describing the real-time tilt adjustment will be defined.

Figure 19:
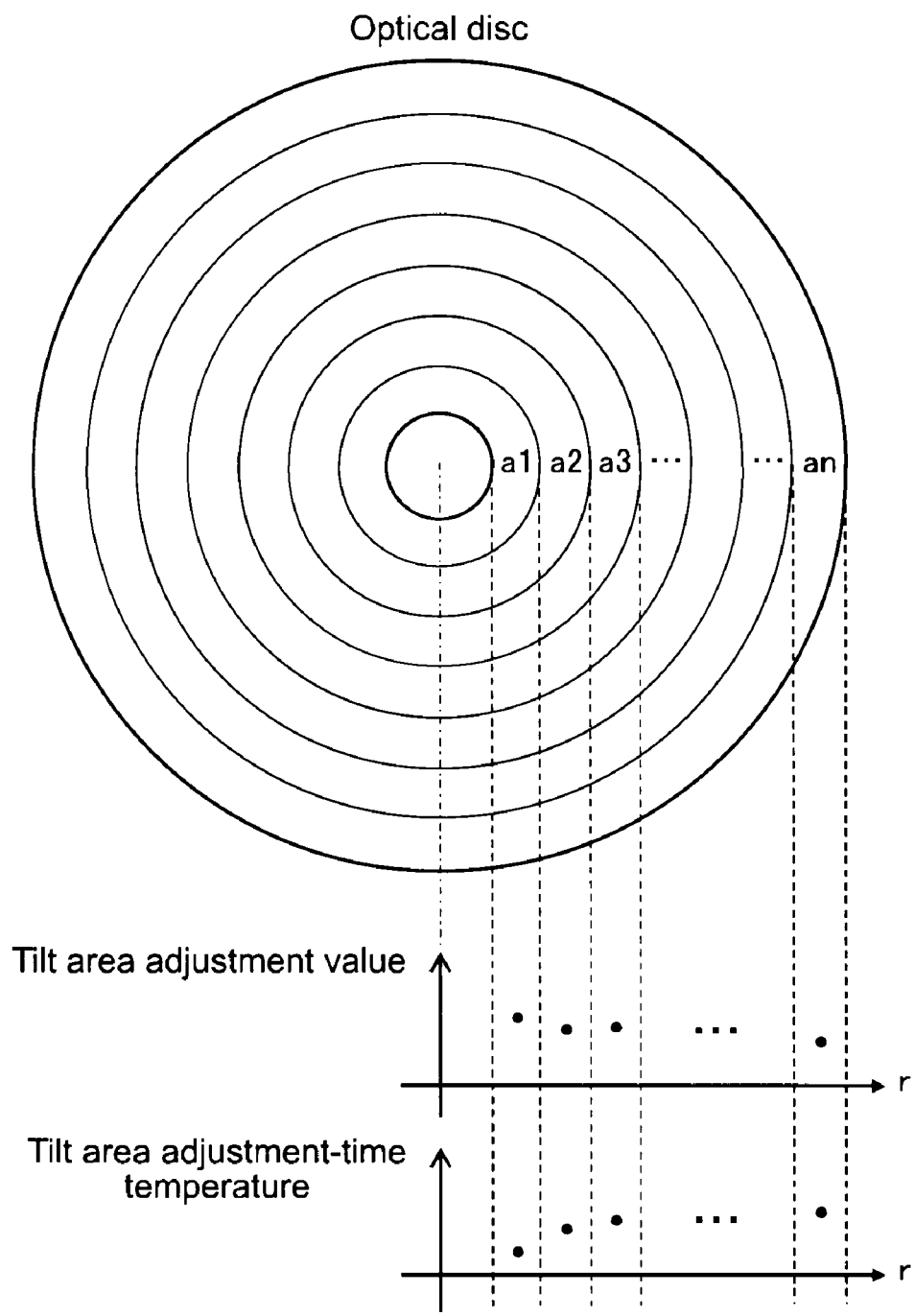
FIG. 19 is a diagram showing a relationship among areas obtained by dividing an optical disc at radial positions, and a tilt area adjustment value and a tilt area adjustment-time temperature for each area.

As shown in FIG. 19, a "tilt area adjustment value" is a tilt adjustment value obtained in each of areas a1, a2, a3, ..., and an obtained by dividing the optical disc at radial positions. The tilt area adjustment values are stored in a nonvolatile memory (not shown) of the system controller 105 of the reproducing apparatus 101 and updated with a latest tilt adjustment value obtained by the real-time tilt adjustment.

The "tilt adjustment value" is a tilt setting value used as a reference value of an "evaluation tilt adjustment value" to be described later at a time of the real-time tilt adjustment.

The "evaluation tilt adjustment value" is a tilt setting value used for obtaining an evaluation value at the time of the real-time tilt adjustment. With the "tilt adjustment value" being represented by C, the "evaluation tilt adjustment value" is a value expressed by C+ΔC and C−ΔC. ΔC is a displacement amount given in advance.

The "tilt setting value" is a value given to the tilt correction operation section 141 of the servo circuit 106 from the system controller 105 at the time of the real-time tilt adjustment. The tilt correction operation section 141 generates differential data to be added to the two pieces of focus control data based on the tilt setting value. In the real-time tilt adjustment, the "evaluation tilt adjustment value" becomes the "tilt setting value".

Figure 20:
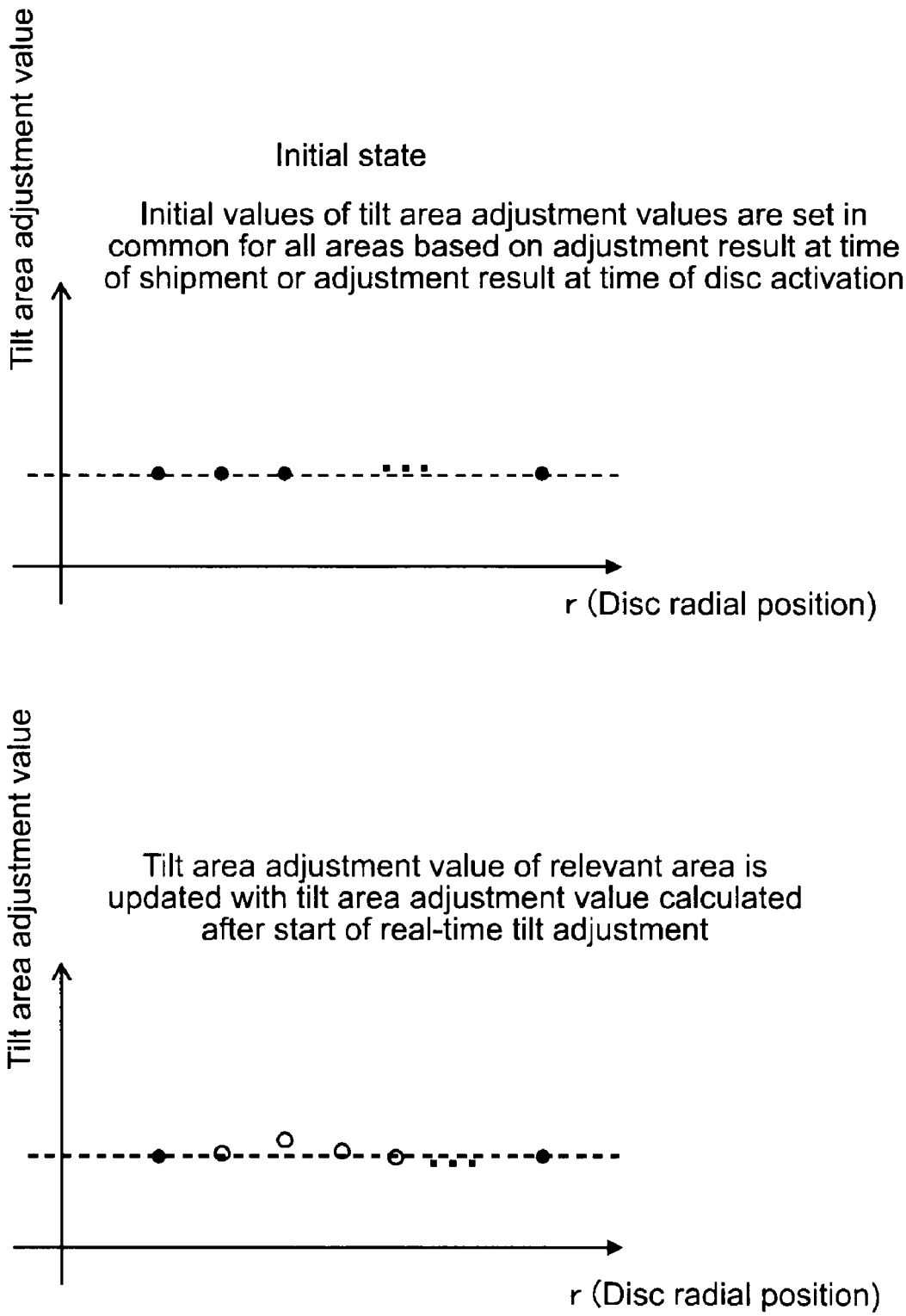
FIG. 20 is a diagram showing updates of the tilt area adjustment values in a real-time tilt adjustment.

FIG. 20 is a diagram showing update states of tilt area adjustment values in the real-time tilt adjustment. In an initial state before starting the real-time tilt adjustment, a common initial value is set as the tilt area adjustment value for all areas. The initial value is calculated as follows, for example.

When adjustment data at a time of shipment is stored in a nonvolatile memory in advance, the system controller 105 reads out the adjustment data from the nonvolatile memory at a time of start-up and sets it as the initial value of the tilt area adjustment value of each area. On the other hand, when the adjustment data at the time of shipment is not stored in the nonvolatile memory, the system controller 105 carries out a tilt adjustment on a predetermined partial area of the optical disc at the time of the start-up and sets the tilt adjustment value as the initial value of the tilt area adjustment value of all areas. During the real-time tilt adjustment, every time the tilt adjustment value is obtained by the calculation, the tilt area adjustment value of the corresponding area is updated with the tilt adjustment value. By repeating this processing for all the areas, the tilt area adjustment values of the areas with respect to the optical disc during reproduction can be obtained.

At a time of start of the real-time tilt adjustment including after the long-distance seek, the adjustment is resumed after a tilt area adjustment value (corresponding to disc radius of seek destination) is copied to the tilt adjustment value as the initial value of the real-time tilt adjustment. Thus, the real-time tilt adjustment can be favorably executed from right after the long-distance seek.

Next, an operation of the real-time tilt adjustment will be described.

Figure 21:
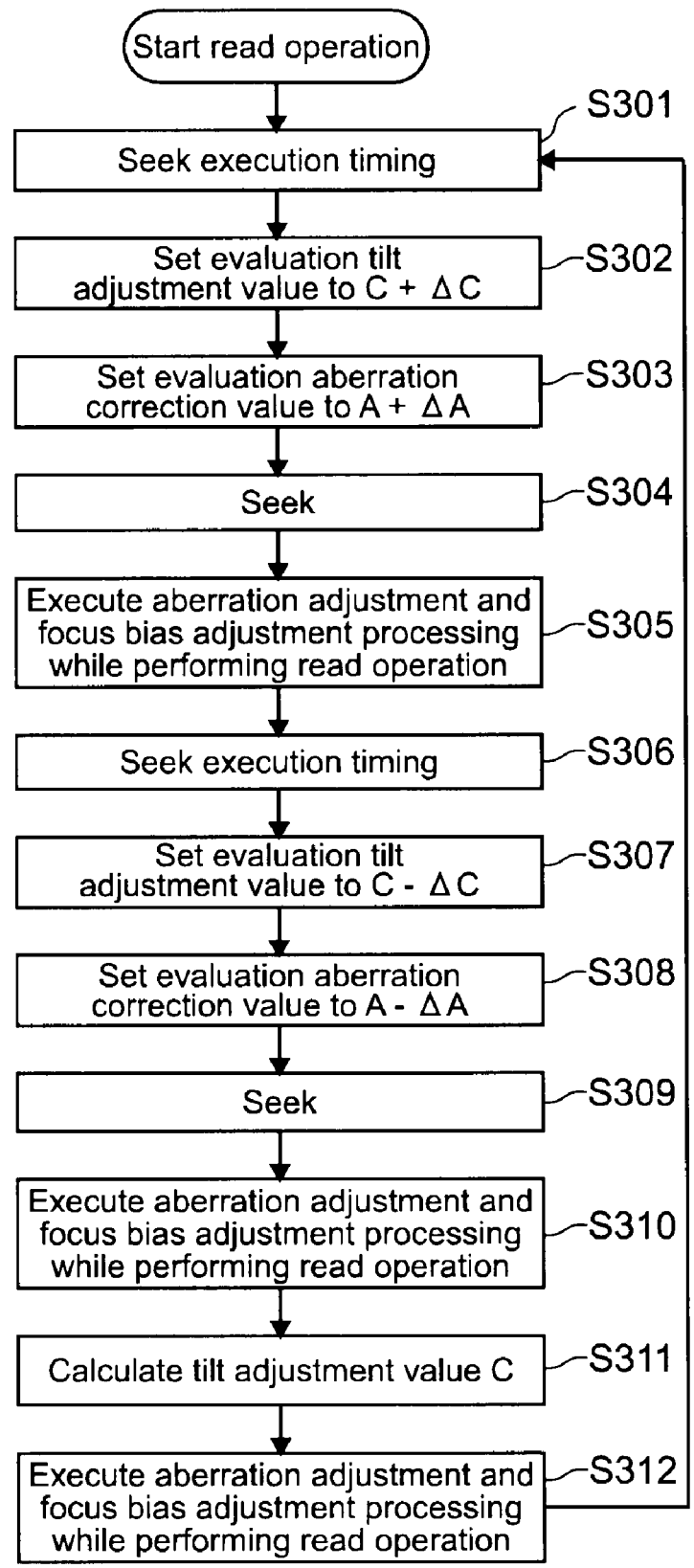
FIG. 21 is a flowchart of the real-time tilt adjustment.

FIG. 21 is a flowchart of the real-time tilt adjustment during read.

1. Upon receiving a read command from the external AV system AVS1, the system controller 105 of the reproducing apparatus 101 judges a seek execution timing for performing a seek operation for moving the optical pickup 103 in front of a target read start position on the optical disc 102 (Step S301). Upon judging the seek execution timing, the system controller 105 sets C+ΔC as the evaluation tilt adjustment value (Step S302) and sets A+ΔA as the evaluation aberration correction value (Step S303). Subsequently, the system controller 105 transmits a seek command signal to the servo circuit 106 to perform control so as to execute an actual seek operation (Step S304).

It should be noted that here, although a timing of setting the evaluation tilt adjustment value and the evaluation aberration correction value is right before executing seek, the timing may instead be during the seek operation.

2. At a time a read operation is enabled to be performed from the target read start position on the optical disc 102, the system controller 105 executes the aberration adjustment and the focus bias adjustment while executing the read operation (Step S305).

3. Data read out from the optical disc 102 and subjected to binarization processing in a reader circuit 113, demodulation processing in a demodulation circuit 114, and decode processing in a decoder 115 is transferred to a buffer inside the decoder 115 to be stored therein. When the buffer becomes full, the mode temporarily shifts from the reproduction mode to the standby mode, and the read operation is resumed thereafter when the data is read out from the buffer and an amount of data stored in the buffer falls below a certain value. Here, a seek execution timing occurs again (Step S306).

4. When the first seek execution timing after ending a predetermined number (1 or more) of aberration adjustment calculations is judged, the system controller 105 changes the evaluation tilt adjustment value to C−ΔC (Step S307) and thereafter changes the evaluation aberration correction value to A−ΔA (Step S308). Subsequently, the system controller 105 transmits a seek command signal to the servo circuit 106 to perform control so as to execute an actual seek operation (Step S309).

5. At the time the optical pickup 103 is enabled to perform the read operation from the target read start position on the optical disc 102, the system controller 105 executes the aberration adjustment and the focus bias adjustment while executing the read operation again (Step S310).

6. The system controller 105 calculates the tilt adjustment value C upon ending reproduction of a section in which the evaluation tilt adjustment value is set to C−ΔC (Step S311). At this time, the system controller 105 updates the tilt area adjustment value of the area to which the current position on the disc radius belongs with the new tilt adjustment value C.

7. The system controller 105 executes the aberration adjustment and the focus bias adjustment while executing the read operation after that (Step S312). Then, when the first seek execution timing after ending a predetermined number (1 or more) of aberration adjustment calculations is judged (Step S301), the system controller 105 performs control to again set the evaluation tilt adjustment value to C+ΔC and repeat the operation thereafter.

It should be noted that if the long-distance seek in which the movement amount in the disc radial direction is a certain value or more is performed in the real-time tilt adjustment described above, the system controller 105 stops the real-time tilt adjustment operation and starts over the processing from Step S301.

Figure 22:
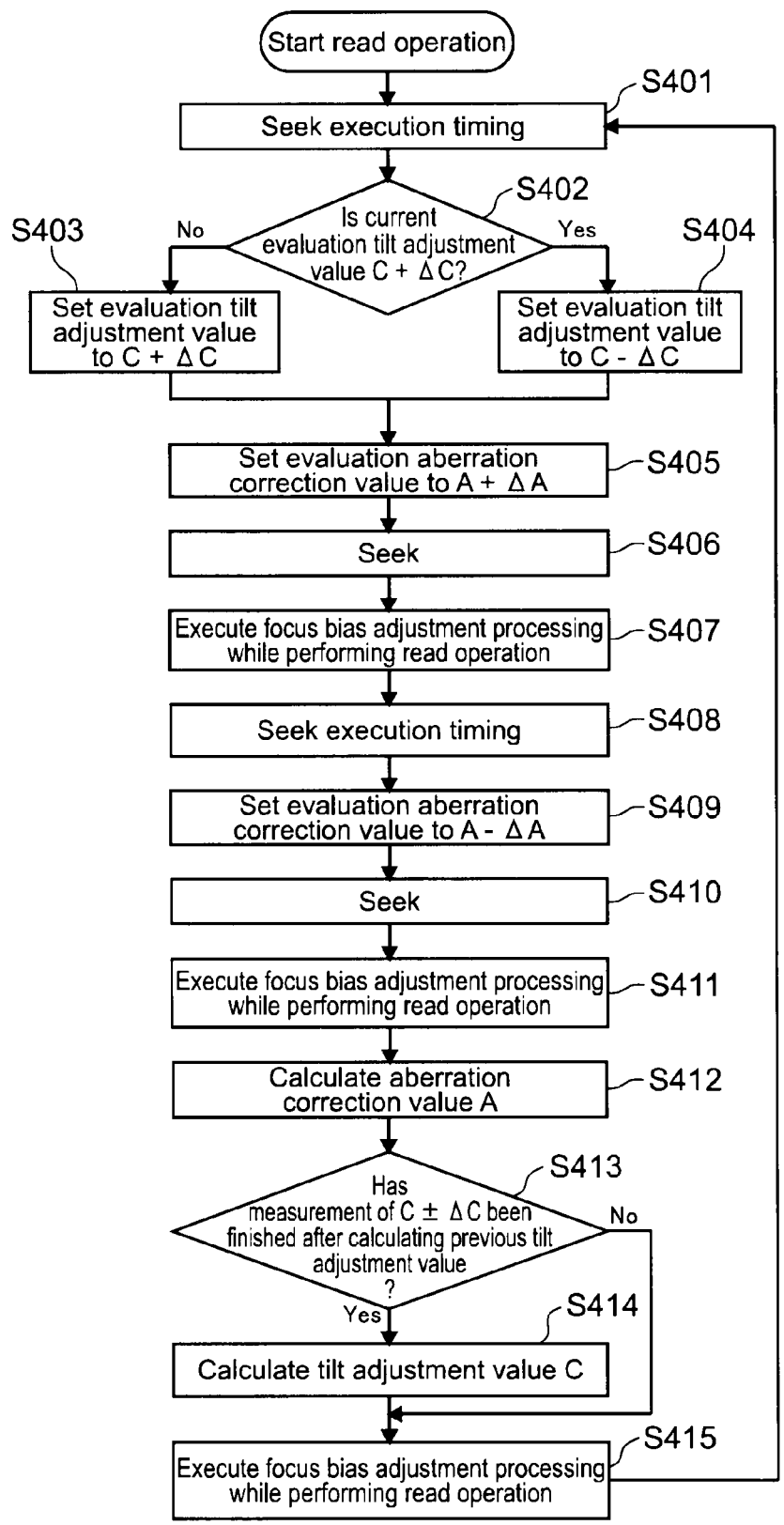
FIG. 22 is a flowchart of a real-time tilt adjustment as a modified example of the real-time tilt adjustment shown in FIG. 21.

The operation carried out in the case of carrying out the real-time tilt adjustment by changing the evaluation tilt adjustment value every time a first seek execution timing is judged after a predetermined number of (1 or more) aberration adjustment calculations is ended has been described heretofore. An operation of a real-time tilt adjustment in a case where the predetermined number of times is 1 is as follows. FIG. 22 is a flowchart of the real-time tilt adjustment in this case.

1. Upon receiving a read command from the external AV system AVS1, the system controller 105 of the reproducing apparatus 101 judges a seek execution timing for performing a seek operation for moving the optical pickup 103 in front of a target read start position on the optical disc 102 (Step S401). Upon judging the seek execution timing, the system controller 105 performs a setting of the evaluation tilt adjustment value as follows.

The system controller 105 sets C+ΔC as a new evaluation tilt adjustment value when the current evaluation tilt adjustment value (before setting change) is C−ΔC (Step S403) and sets C−ΔC as the new evaluation tilt adjustment value when the current evaluation tilt adjustment value is C+ΔC (Step S404). Subsequently, the system controller 105 sets A+ΔA as the evaluation aberration correction value (Step S405). Next, the system controller 105 transmits a seek command signal to the servo circuit 106 to execute an actual seek operation (Step S406).

2. At a time the optical pickup 103 is enabled to perform a read operation from the target read start position on the optical disc 102, the system controller 105 executes the focus bias adjustment processing while executing the read operation (Step S407).

3. Data read out from the optical disc 102 and subjected to binarization processing in the reader circuit 113, demodulation processing in the demodulation circuit 114, and decode processing in the decoder 115 is transferred to the buffer inside the decoder 115 to be stored therein. When the buffer becomes full, the mode temporarily shifts from the reproduction mode to the standby mode, and the read operation is resumed thereafter when the data is read out from the buffer and an amount of data stored in the buffer falls below a certain value. Here, a seek execution timing occurs again (Step S408).

4. The system controller 105 changes the evaluation aberration correction value to A−ΔA (Step S409). After that, the system controller 105 transmits a seek command signal to the servo circuit 106 to execute an actual seek operation (Step S410).

5. At the time the optical pickup 103 is enabled to perform the read operation from the target read start position on the optical disc 102, the system controller 105 executes the focus bias adjustment processing while executing the read operation again (Step S411). After that, the system controller 105 calculates an aberration correction value A based on the evaluation value obtained at a time the evaluation aberration correction value is set to A+ΔA and the evaluation value obtained at a time the evaluation aberration correction value is set to A−ΔA (Step S412).

6. After that, upon obtaining the evaluation value obtained in the state where the evaluation tilt adjustment value is C+ΔC and the evaluation value obtained in the state where the evaluation tilt adjustment value is C−ΔC (YES in Step S413), the system controller 105 calculates the tilt adjustment value C (Step S414). At this time, the system controller 105 updates the tilt area adjustment value of the area to which the current position on the disc radius belongs with the tilt adjustment value C obtained as a result of the calculation.

7. The system controller 105 executes the focus bias adjustment while executing the read operation after that (Step S415). Then, when the next seek execution timing is judged (Step S401), the system controller 105 performs control to repeat the operation thereafter from the process of changing the evaluation tilt adjustment value.

(Calculation Method of Tilt Adjustment Value During Real-Time Tilt Adjustment)

Next, a calculation method of the tilt adjustment value during the real-time tilt adjustment will be described.

Figure 23:
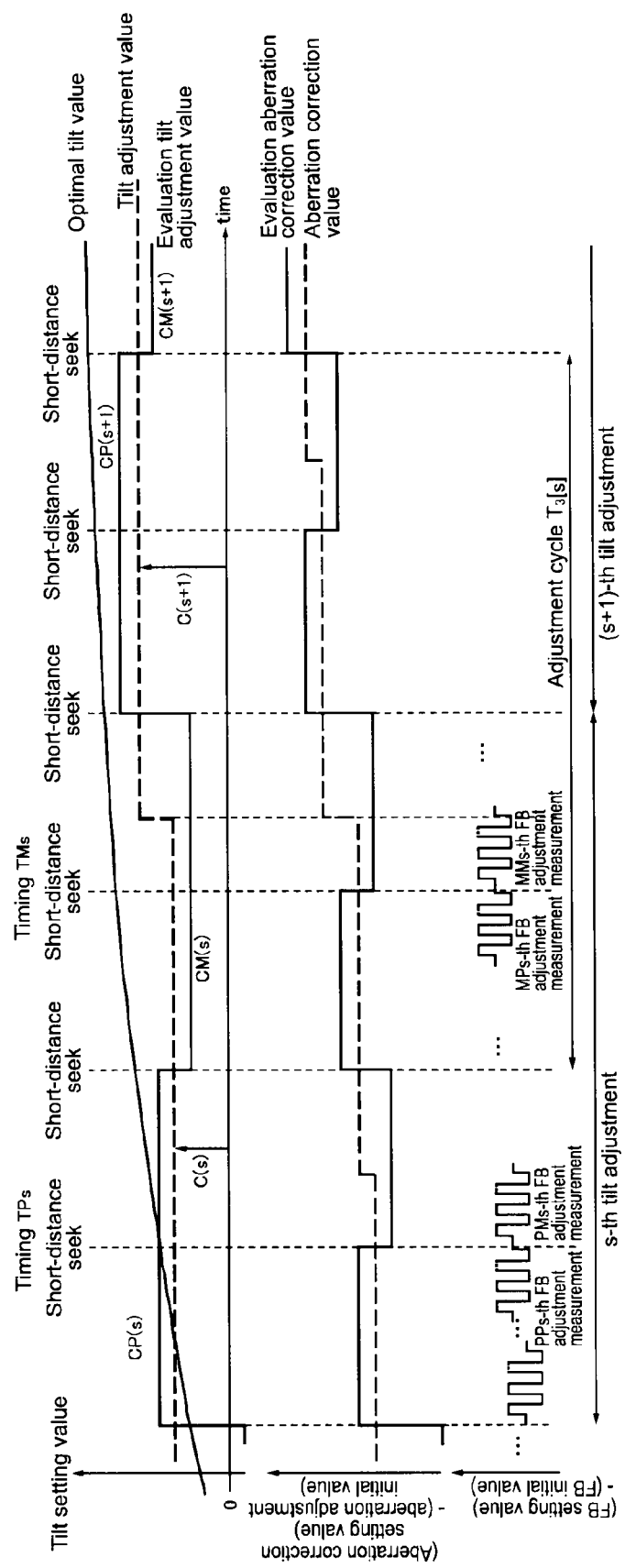
FIG. 23 is a diagram showing a relationship among the tilt adjustment, the aberration adjustment, and the focus bias adjustment during read.

FIG. 23 is a diagram showing a relationship among the tilt adjustment, the aberration adjustment, and the focus bias adjustment in a case where the real-time tilt adjustment is carried out by changing the evaluation tilt adjustment value every time a first seek execution timing after one aberration adjustment calculation is ended is judged. The ordinate axes of FIG. 23 represent setting values of a tilt, an aberration, and a focus bias, and the abscissa axis represents time.

1. A tilt adjustment value obtained at a time an s-th real-time tilt adjustment is started is represented by C(s). The system controller 105 sets the evaluation tilt adjustment value to be CP(s)=C(s)+ΔC at the seek execution timing at which the s-th real-time tilt adjustment is started.

2. The system controller 105 executes the aberration adjustment and the focus bias adjustment while the evaluation tilt adjustment value is set to CP(s).

3. The system controller 105 changes the evaluation tilt adjustment value to be CM(s)=C(s)−ΔC at the seek execution timing at which one aberration adjustment calculation is ended. For description, a timing at which the evaluation aberration correction value is switched from plus to minus right before that is represented by TPs, and a timing at which the evaluation aberration correction value is switched from minus to plus right after that is represented by TMs.

4. For description, focus bias adjustments are named as follows.

Focus bias adjustment right before TPs: PPs-th measurement

Focus bias adjustment right after TPs: PMs-th measurement

Focus bias adjustment right before TMs: MPs-th measurement

Focus bias adjustment right after TMs: MMs-th measurement

5. Upon ending the MMs-th measurement, the system controller 105 calculates the tilt adjustment value by the following procedure.

(a) An average value of evaluation values obtained in each of the PPs-th measurement and the PMs-th measurement of the focus bias adjustment is represented by xp(s), and an average value of evaluation values obtained in each of the MPs-th measurement and the MMs-th measurement of the focus bias adjustment is represented by xm(s).

At this time, xp(s) and xm(s) are respectively expressed as follows.

[Expression 5]

$$xp(s) = \frac{\left(\frac{yp(PPs) + ym(PPs)}{2} + \frac{yp(PMs) + ym(PMs)}{2}\right)}{2} \quad (5)$$

[Expression 6]

$$xm(s) = \frac{\left(\frac{yp(MPs) + ym(MPs)}{2} + \frac{yp(MMs) + ym(MMs)}{2}\right)}{2} \quad (6)$$

Here, xp(s) is an average value of evaluation values measured with the evaluation tilt adjustment value on the plus side, and xm(s) is an average value of evaluation values measured with the evaluation tilt adjustment value on the minus side.

Furthermore, a differential between xp(s) and xm(s) is as follows.

$$x(s)=xp(s)-xm(s)$$

(b) Next, the system controller 105 calculates the tilt adjustment value as follows.

[Expression 7]

$$g(s) = g(s-1) + K_{3p}\left\{\frac{x(s)-}{x(s-1)}\right\} + K_{3i}T_3\left\{\frac{x(s)+x(s-1)-\frac{2x_{target}}{2}}{2}\right\} \quad (7)$$

Here, g(s) is a tilt adjustment value that is calculated in the s-th tilt adjustment and expressed by g(s)=C(s+1), g(s−1) is a tilt adjustment value that is calculated in the (s−1)-th tilt adjustment and expressed by g(s−1)=C(s), x(s) is an evaluation value differential measured in the measurement of the s-th tilt adjustment, x(s−1) is an evaluation value differential measured in the measurement of the (s−1)-th tilt adjustment, $x_{target}$ is a target value of the evaluation value differential, $T_3$ is an adjustment interval [s], $K_{3p}$ is proportional gain, and $K_{3i}$ is an integral gain.

Expression 7 corresponds to that obtained by discretizing the following PI controlling expression.

[Expression 8]

$$g(t)=K_{3p}\{x(t)-x_{target}\}K_{3i}\int\{x(t)-x_{target}\}dt \quad (8)$$

Here, $K_{3p}$ and $K_{3i}$ are adjustment gains and determined so as to satisfy desired performance.

6. Upon ending the calculation by the above procedure, the system controller 105 executes the aberration adjustment and the focus bias adjustment while the evaluation tilt adjustment value is set to CM(s). Then, the system controller 105 changes the evaluation tilt adjustment value to be CP(s+1)=C(s+1)+ΔC at the first seek execution timing after one aberration adjustment calculation is ended and similarly performs the adjustment thereafter.

Figure 24:
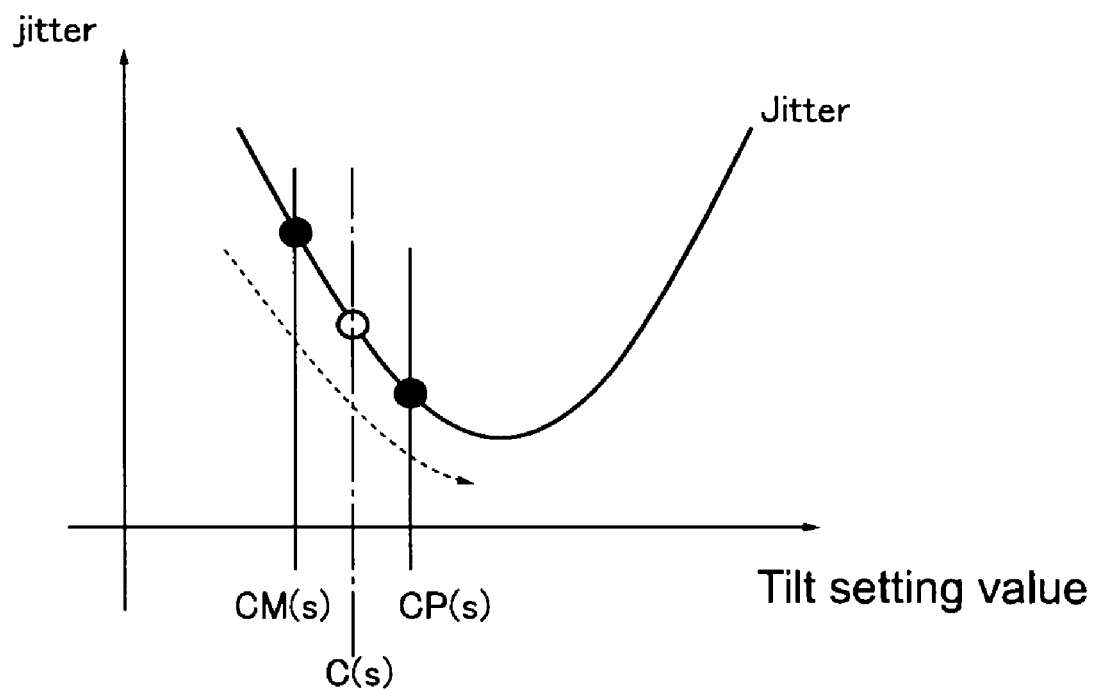
FIG. 24 is a diagram showing a relationship between an evaluation tilt adjustment value and the evaluation value in the case where a jitter values is adopted as the evaluation value.

FIG. 24 is a diagram showing a relationship between the evaluation tilt adjustment value and the evaluation value in a case where a jitter value is adopted as the evaluation value. The average value xp(s) of the evaluation values obtained in the sections in which the evaluation tilt adjustment value is set on the plus side of the tilt adjustment value and the average value xm(s) of the evaluation values obtained in the sections in which the evaluation tilt adjustment value is set on the minus side of the tilt adjustment value correspond to jitter values indicated by the black dots in FIG. 24. Therefore, if $x_{target}$ is set to 0, a jitter bottom can be adjusted to a target value.

According to the embodiment described heretofore, a real-time tilt adjustment can be favorably carried out while performing the focus bias adjustment and the aberration adjustment after start-up. In addition, according to this embodiment, since an integration effect of the evaluation values is imparted to the calculation of the real-time tilt adjustment and an effect of a measurement error of a jitter value is thus reduced as much as possible, an amplitude during an adjustment operation and an effect of the adjustment operation on read performance can be reduced.

The above embodiment has described the case of executing the focus bias adjustment, the aberration adjustment, and the tilt adjustment during read. However, the present invention is not limited thereto, and the adjustments may be similarly executed during idling.

Moreover, the above embodiment has described the case where the present invention is applied to the reproducing apparatus 101. However, the focus bias adjustment, the aberration adjustment, and the tilt adjustment may be executed during at least one of read, idle, and write in a recording/reproducing apparatus.

The above embodiment has described the case of adjusting a spherical aberration of laser light. However, the present invention is not limited to a spherical aberration and is also applicable to an adjustment of various other aberrations caused in the laser light.

Hereinafter, a modified example of the second embodiment above will be described.

Modified Example 9

Improvement of Tilt Adjustment Accuracy by Improvement of Evaluation Value Accuracy Since a distance between acquisition positions of the average values xp(s) and xm(s) in the disc radial direction becomes smaller as alternate acquisition timings of the average values xp(s) and xm(s) are closer to each other, evaluation value accuracy can be improved.

There is the following method of bringing the alternate acquisition timings of the average values xp(s) and xm(s) closer to each other than in the second embodiment.

Figure 25:
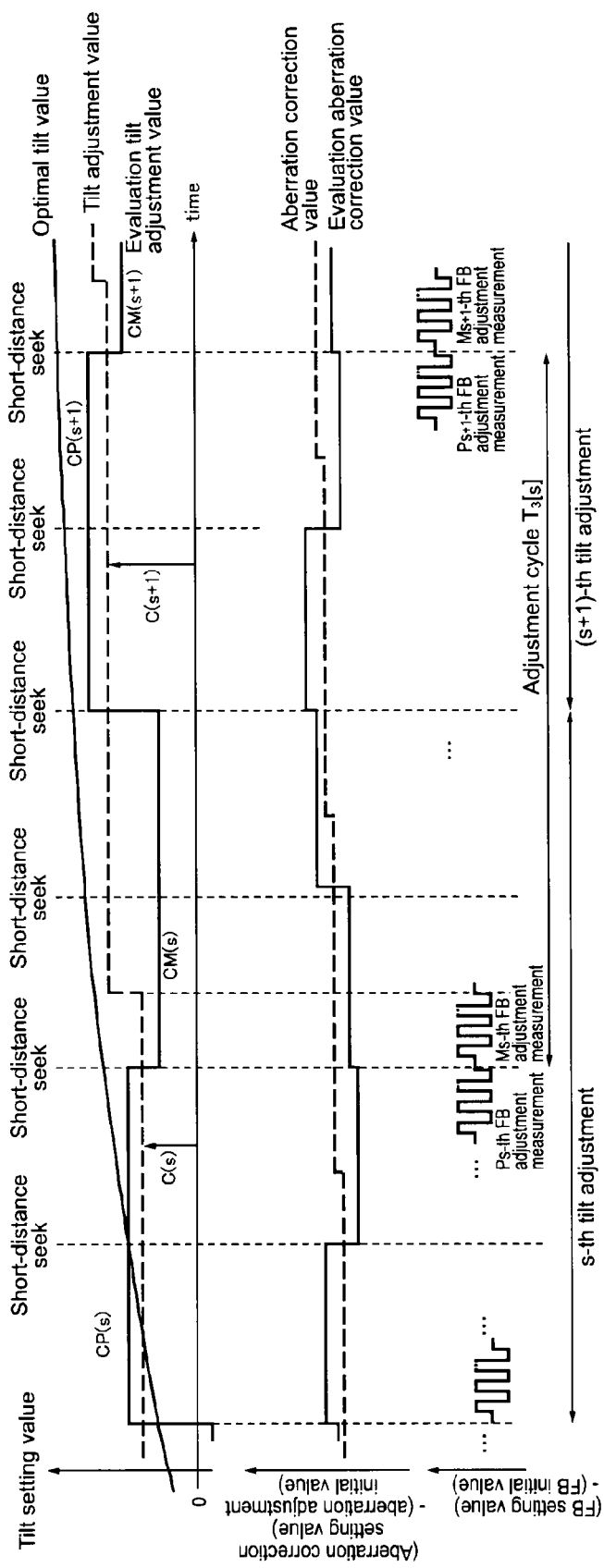
FIG. 25 is a diagram showing a modified example of switching plus and minus of an evaluation aberration correction value with respect to the aberration correction value.

FIG. 25 is a diagram showing a modified example in which an order of switching the evaluation aberration correction value on the plus side of the aberration correction value and the evaluation aberration correction value on the minus side of the aberration correction value is changed from that of the second embodiment for bringing the alternate acquisition timings of the average values xp(s) and xm(s) closer to each other. In the second embodiment, the plus section and the minus section of the evaluation aberration correction value are switched alternately in the stated order of plus, minus, plus, minus, plus, minus, . . . with respect to the aberration correction value. On the other hand, in this modified example, the plus section and the minus section are switched alternately in the stated order of plus, minus, minus, plus, plus, minus, . . . , for example.

In FIG. 25, out of the focus bias adjustments right before and after the timing at which the evaluation tilt adjustment value is switched from CP(s) to CM(s), the focus bias adjustment of the section CP(s) in which the evaluation tilt adjustment value is set on the plus side of the tilt adjustment value is referred to as Ps-th measurement, and the focus bias adjustment of the section CM(s) in which the evaluation tilt adjustment value is set on the minus side of the tilt adjustment value is referred to as Ms-th measurement. As a result, the average value xp(s) of the evaluation values obtained in the Ps-th measurement and the average value xm(s) of the evaluation values obtained in the Ms-th measurement can be respectively calculated as follows.

[Expression 9]

$$xp(s) = \frac{yp(Ps) + ym(Ps)}{2} \quad (9)$$

[Expression 10]

$$xm(s) = \frac{yp(Ms) + ym(Ms)}{2} \quad (10)$$

After that, the calculation of the tilt adjustment value is carried out in the same manner as in the second embodiment.

According to the modified example, as the calculation of the average values xp(s) and xm(s) is made simpler than that in the second embodiment, the alternate acquisition timings of the average values xp(s) and xm(s) can be brought closer to each other and the evaluation value accuracy of the tilt adjustment can be improved that much.

Modified Example 10

Method of Reducing Effect of Aberration Adjustment on Tilt Adjustment

Since the calculation of the average values xp(s) and xm(s) is carried out while the aberration adjustment is operating, the evaluation value accuracy for the tilt adjustment tends to become lower as an adjustment amount of one aberration adjustment increases. There are the following two methods for suppressing such a problem.

1. A method of skipping a calculation and update of a tilt adjustment value when an adjustment amount of one aberration adjustment is larger than a predetermined value.

Figure 26:
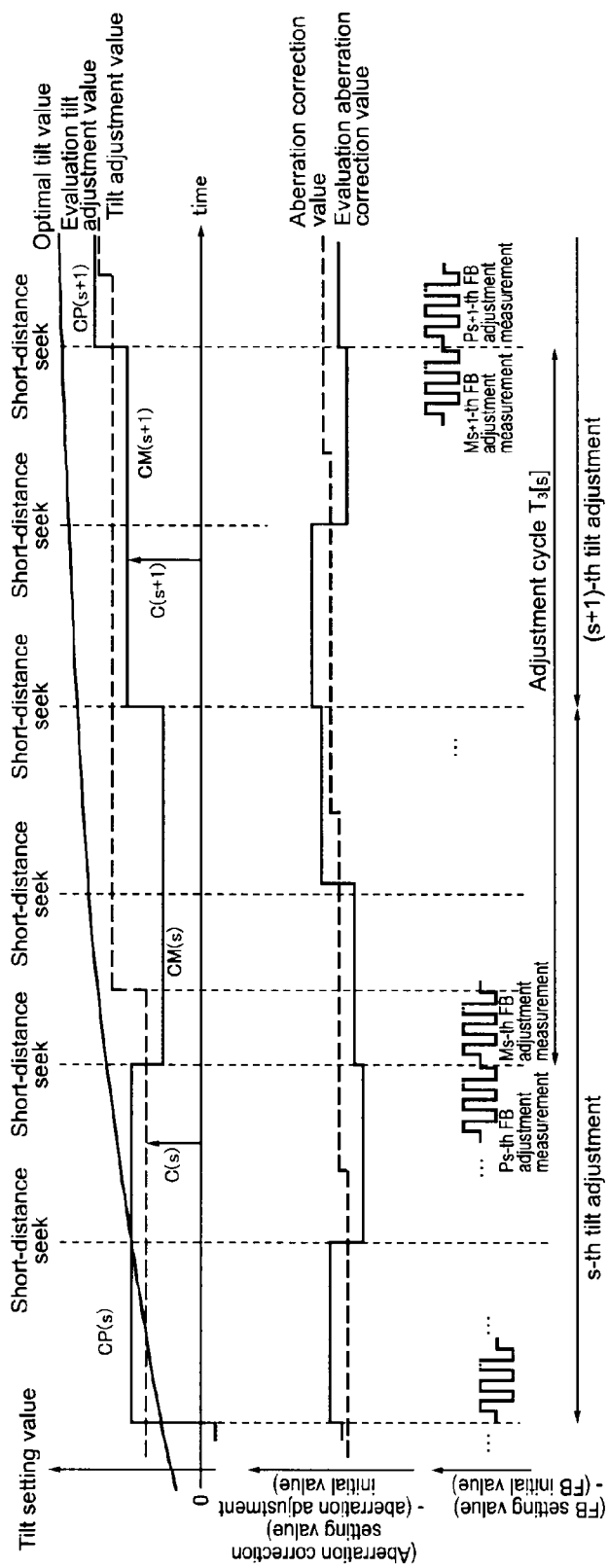
FIG. 26 is a diagram showing a modified example of switching plus and minus of the evaluation tilt adjustment value with respect to the tilt adjustment value.

2. A method of alternately updating the plus section and the minus section of the evaluation tilt adjustment value so that an order of switching the evaluation tilt adjustment value on the plus side of the tilt adjustment value and the evaluation tilt adjustment value on the minus side of the tilt adjustment value becomes plus, minus, minus, plus, plus, minus, . . . , for example, as shown in FIG. 26.

Modified Example 11

Update Timings of Tilt Setting Value and Aberration Correction Setting Value

Timings of updating the tilt setting value and the aberration correction setting value are not limited to the seek execution timings. For example, the tilt setting value and the aberration correction setting value may be updated in a preset time cycle.

Modified Example 12

Handling of Lens Tilt Sensitivity Fluctuation Due to Temperature

When an inexpensive plastic lens is used for the objective lens, a coma aberration generation sensitivity with respect to a lens tilt fluctuation (lens tilt sensitivity) may fluctuate. In this regard, if a displacement amount $\Delta C$ of an evaluation tilt adjustment value can be corrected by a temperature detected by the temperature sensor 150 (FIG. 16), a tilt adjustment can be carried out accurately even when the lens tilt sensitivity fluctuates. As a specific method, there are the following three methods.

1. A method of storing a displacement amount $\Delta C$ of an evaluation tilt adjustment value of each temperature range in a memory of the system controller 105 and reading out the displacement amount $\Delta C$ corresponding to the detected temperature range from the memory.

2. A method of obtaining a displacement amount $\Delta C$ of an evaluation tilt adjustment value using a calculation expression of a lens tilt sensitivity.

For example, the system controller 105 calculates a tilt area adjustment value corrected by a temperature as follows.

With Temp_now [deg] representing a current temperature, Temp_0 [deg] representing a reference temperature [deg], a lens tilt sensitivity at a temperature T being represented by f(T) [disc tilt deg/lens tilt deg], and $C_{Temp0}$ representing a displacement amount setting value at the reference temperature, a displacement amount $\Delta C_{Temp\_now}$ at a time the temperature is Temp_now can be calculated as follows.

[Expresion 11]

$$\Delta C_{temp\_now} = \Delta C_{temp\_0} \cdot \frac{f(\text{Temp\_0})}{f(\text{Temp\_now})} \quad (11)$$

3. A method of storing, for each area, information on a tilt area adjustment-time temperature at a time of update of a tilt area adjustment value as shown in FIG. 19 and correcting the tilt area adjustment value while taking into account a fluctuation amount of a lens tilt sensitivity due to a difference between the tilt area adjustment-time temperature and the current temperature of a corresponding area in referencing the tilt area adjustment value as an initial value of a real-time tilt adjustment. By this method, even in a state where the lens tilt sensitivity fluctuates due to the temperature, a real-time tilt adjustment can be carried out favorably from right after executing long-distance seek.

For example, with the tilt area adjustment value being represented by TACn [step], the tilt area adjustment-time temperature being represented by Temp_TACn [deg], the current temperature being represented by Temp_now [deg], and the lens tilt sensitivity at a temperature T being represented by f(T) [disc tilt deg/lens tilt deg], the corrected tilt area adjustment value can be calculated as follows.

(Corrected tilt area adjustment value)=$TACn*f$(Temp_$TACn$)/$f$(Temp_now)   (12)

Next, an operation carried out in a case where the tilt area adjustment value is updated by the method of 3. above will be described in detail.

Figure 27:
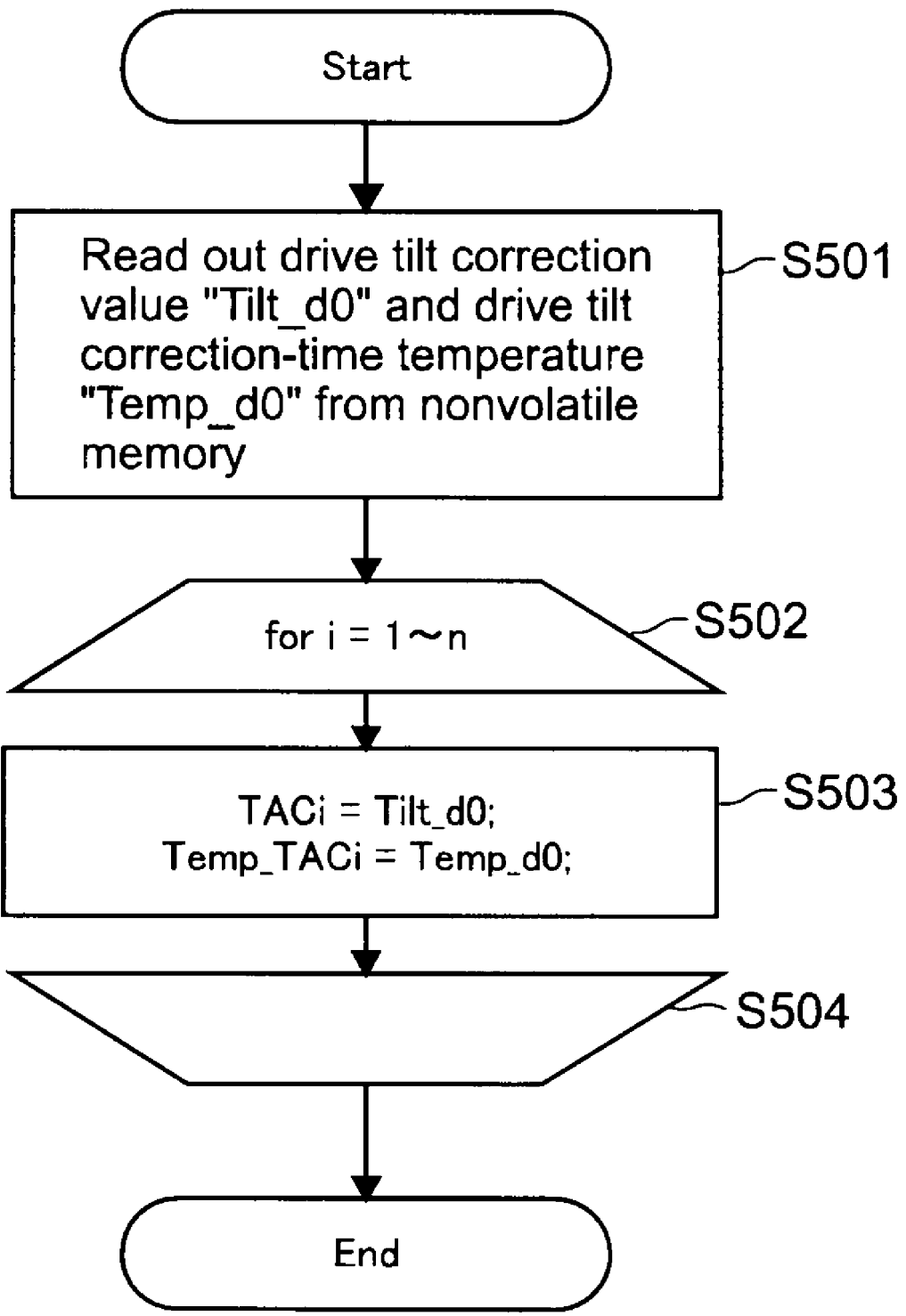
FIG. 27 is a flowchart of an initial setting 1 of the tilt area adjustment value and the tilt area adjustment-time temperature.

(1) Initial Setting 1 of Tilt Area Adjustment Value and Tilt Area Adjustment-Time Temperature FIG. 27 is a flowchart of an initial setting 1 of the tilt area adjustment value and the tilt area adjustment-time temperature.

Here, an arbitrary area on the optical disc is represented by ai, a tilt area adjustment value corresponding to the area ai is represented by TACi, and a tilt area adjustment-time temperature corresponding to the area ai is represented by Temp_TACi.

At a time of start-up, the system controller 105 reads out a drive tilt correction value Tilt_d0 and a drive tilt correction-time temperature Temp_d0 as adjustment data at a time of shipment from a nonvolatile memory (Step S501). The system controller 105 sets those pieces of information as initial values of a tilt area adjustment value TACi and a tilt area adjustment-time temperature Temp_TACi of all areas (Steps 502 to S504). It should be noted that the drive tilt correction value is a value for correcting a fixed tilt of the reproducing apparatus itself in the tilt direction.

(2) Initial Setting 2 of Tilt Area Adjustment Value and Tilt Area Adjustment-Time Temperature For example, in a case where adjustment data at a time of shipment is not stored in the nonvolatile memory, the system controller 105 carries out a tilt adjustment in a partial area of the optical disc at a time of start-up, sets the tilt adjustment result as an initial value of the tilt area adjustment value TACi of all areas, and stores information on a temperature detected by the temperature sensor 150 at the time of the tilt adjustment as the tilt area adjustment-time temperature Temp_TACi of all areas.

Figure 28:
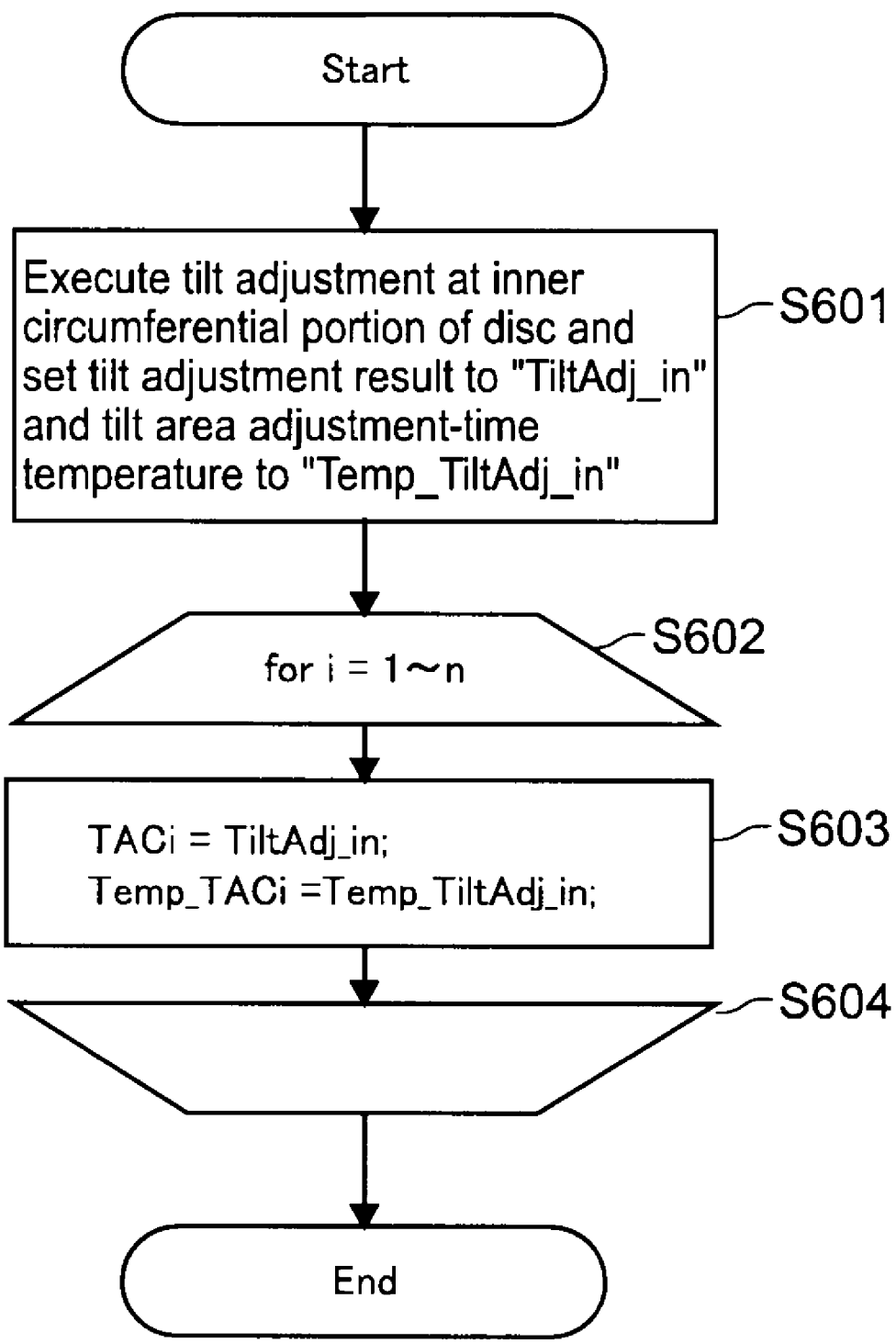
FIG. 28 is a flowchart of an initial setting 2 of the tilt area adjustment value and the tilt area adjustment-time temperature.

FIG. 28 is a flowchart of an initial setting 2 of the tilt area adjustment value and the tilt area adjustment-time temperature.

At a time of start-up, the system controller 105 executes a tilt adjustment only in a partial area such as an inner circumferential portion of a disc to obtain TiltAdj_in as a tilt adjustment value and Temp_TiltAdj_in as a tilt area adjustment-time temperature (Step S601). Subsequently, the system controller 105 sets TiltAdj_in as the tilt area adjustment value TACi of all areas and Temp_TiltAdj_in as the tilt area adjustment-time temperature Temp_TACi of all areas (Steps 602 to S604). It should be noted that here, the tilt adjustment is executed only on the inner circumferential portion of the disc at the time of the start-up. However, the present invention is not limited thereto, and it is also possible to execute the tilt adjustment at other specific portions such as an outer circumferential portion of a disc and set the tilt area adjustment value TACi and tilt area adjustment-time temperature Temp_TACi of all areas, for example.

(3) Update of Tilt Area Adjustment Value

At a time of a real-time tilt adjustment, the tilt area adjustment value TACi of a corresponding area is updated with the calculated tilt adjustment value C, and the tilt area adjustment-time temperature Temp_TACi of the same area is updated with information on a temperature detected by the temperature sensor 150 at a time of calculating the tilt adjustment value.

Figure 29:
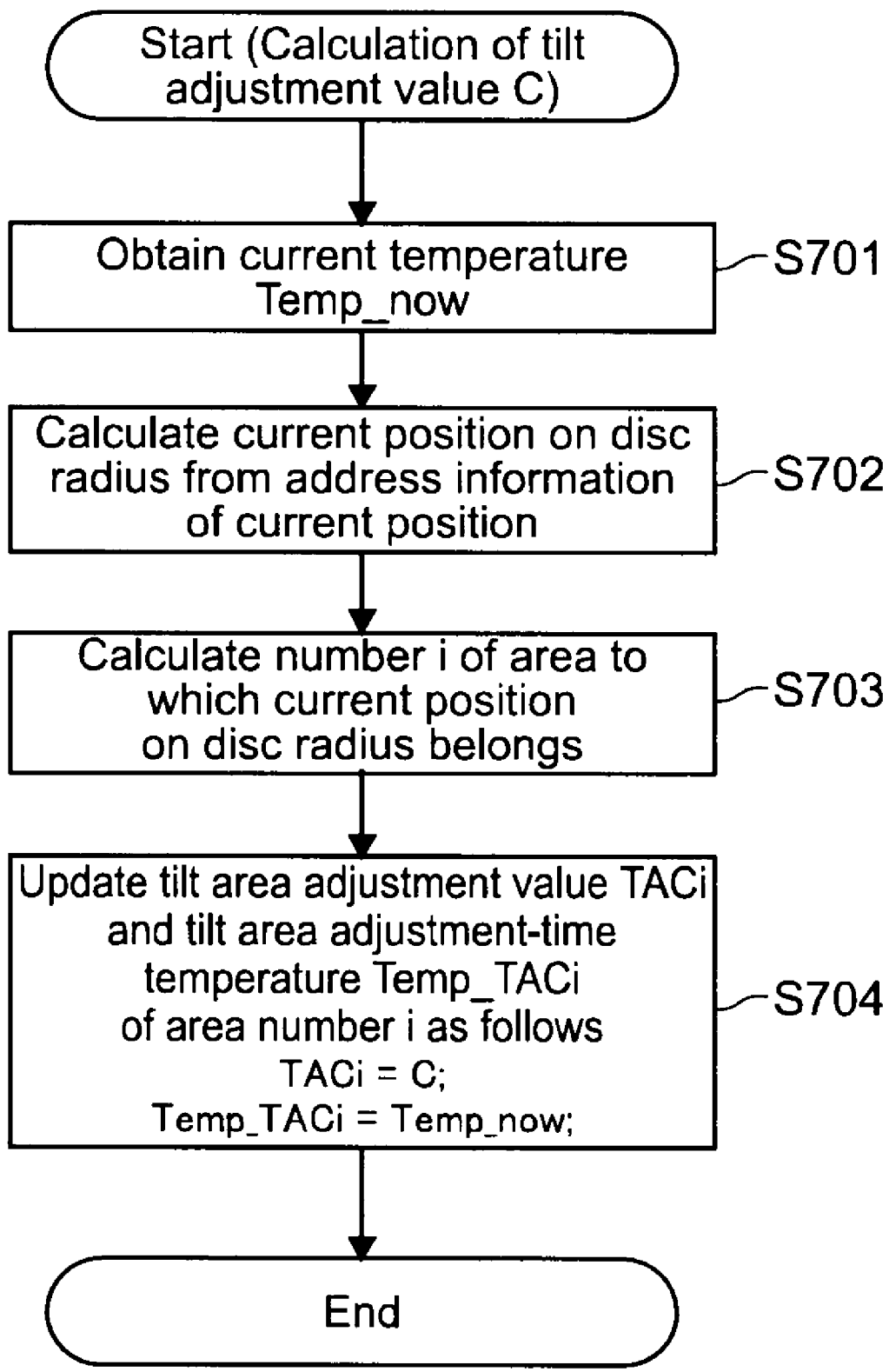
FIG. 29 is a flowchart of an update of the tilt area adjustment value and the tilt area adjustment-time temperature in the real-time tilt adjustment.

FIG. 29 is a flowchart of an update of the tilt area adjustment value and the tilt area adjustment-time temperature in the real-time tilt adjustment.

Upon calculating the tilt adjustment value C by the real-time tilt adjustment, the system controller 105 obtains the current temperature Temp_now at a time of the calculation by the temperature sensor 150 (Step S701). Next, the system controller 105 calculates a current position on the disc radius from address information on the current position (Step S702) and calculates a number i of the area to which the current position on the disc radius belongs (Step S703). After that, the system controller 105 updates the tilt area adjustment value TACi of that area with the tilt adjustment value C and updates the tilt area adjustment-time temperature Temp_TACi with the current temperature Temp_now at the time of the calculation (Step S704).

Modified Example 13

Evaluation Value and Target Value of Evaluation Value Differential

As the evaluation value used in the second embodiment, a jitter value of an RF signal, an amplitude value of the RF signal, and an amplitude value of a wobble signal can be used. Moreover, it is also possible to use an MLSA (Maximum Likelihood Sequence Amplitude), a PRSNR (Partial Response Signal to Noise Ratio) as a quality evaluation index of the PRML, and DMj as the evaluation value. When using those evaluation values, if the target values of the evaluation value differentials are set to be $X_{target}=0$, the tilt adjustment value can be adjusted to an optimal value.

In the adjustments during read (reproduction mode) and idling (standby mode), any of the evaluation values described above can be used. When performing the adjustment during write, a wobble amplitude signal can be used as the evaluation value.

Modified Example 14

Regarding Improvement of Defect Durability

In the real-time tilt adjustment described heretofore, the adjustment accuracy may be lowered due to an effect of a defect that exists in the data recording area of the optical disc during reproduction. For improving a defect durability, a defect component of the tilt adjustment value only needs to be removed by performing an LPF (Low Pass Filter) calculation on the calculated tilt adjustment value.

The case where the present invention is applied to a reproducing apparatus and a recording/reproducing apparatus has been described heretofore. However, the present invention is not limited thereto, and the present invention is also applicable to various other apparatuses capable of recording or reproducing data onto/from an optical disc. For example, the present invention is applicable to an information processing apparatus such as a personal computer, a game apparatus, a car navigation apparatus, and a recording apparatus.

Moreover, the program of the system controller may be stored in advance in a storage section such as a ROM provided in the reproducing apparatus or may be loaded to an internal storage section by being installed via a detachable storage medium that stores the program or a transmission medium such as the Internet.

The present application contains subject matter related to that disclosed in Japanese Priority Patent Application JP 2009-063615 filed in the Japan Patent Office on Mar. 16, 2009, and Japanese Priority Patent Application JP 2009-160900 filed in the Japan Patent Office on Jul. 7, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. A recording/reproducing apparatus, comprising:
a light source to emit laser light;
first correction means for correcting a position of an objective lens that collects the laser light emitted from the light source on a data recording surface of an optical disc based on a focus bias setting value obtained based on a focus bias value;
second correction means for correcting an aberration of the laser light based on an aberration correction setting value obtained based on an aberration correction value;
evaluation value generation means for generating an evaluation value obtained by digitizing a quality of a reproduction signal;
focus bias adjustment means for changing plus and minus of the focus bias value and for calculating a new focus bias value based on the evaluation value generated by the evaluation value generation means upon a reception of a read command; and
aberration adjustment means for carrying out, in parallel with an update of the focus bias value set by the first correction means, an aberration adjustment for changing plus and minus of the aberration correction value and for calculating a new aberration correction value based on the evaluation value generated by the evaluation value generation means upon the reception of the read command.

2. The recording/reproducing apparatus according to claim 1, wherein the focus bias adjustment means obtains a differential between a first evaluation value of a first section in which the focus bias value set by the first correction means is changed to plus and a second evaluation value of a second section in which the focus bias value obtained right after the first section is changed to minus, and calculates the new focus bias value using the current differential value, a previous differential value, and the focus bias value set by the first correction means, and the aberration adjustment means obtains a differential between a third evaluation value of a third section in which the aberration correction value set by the second correction means is changed to plus and a fourth evaluation value of a fourth section in which the aberration correction value obtained right after the third section is changed to minus, and calculates the new aberration correction value using the current differential value, a previous differential value, and the aberration correction value set by the second correction means.

3. The recording/reproducing apparatus according to claim 2, wherein the aberration adjustment means changes plus and minus of the aberration correction value at a seek timing.

4. The recording/reproducing apparatus according to claim 3, wherein the aberration adjustment means carries out the aberration adjustment when a movement amount by the seek in a disc radial direction at a time the aberration correction value is changed from plus to minus is equal to or smaller than a predetermined value.

5. The recording/reproducing apparatus according to claim 4, wherein the aberration adjustment means is restricted so that the plus and minus of the aberration correction value are changed at the seek timing during a first time period since a start-up and an average cycle for changing the plus and minus of the aberration correction value becomes equal to or larger than a predetermined time period after an elapse of the first time period.

6. The recording/reproducing apparatus according to claim 2, wherein the aberration adjustment means varies a cycle of the aberration adjustment based on the differential between the third evaluation value and the fourth evaluation value.

7. The recording/reproducing apparatus according to claim 1, wherein the aberration adjustment means carries out the aberration adjustment until a predetermined time period passes since a start-up.

8. The recording/reproducing apparatus according to claim 1, wherein the aberration adjustment means is restricted so that an average cycle for changing the plus and minus of the aberration correction value becomes equal to or larger than a predetermined time period.

9. The recording/reproducing apparatus according to claim 1, wherein the aberration adjustment means determines on/off of execution of the aberration adjustment based on the evaluation value generated by the evaluation value generation means.

10. The recording/reproducing apparatus according to claim 1, further comprising:
temperature detection means for detecting a temperature, wherein the aberration adjustment means monitors a change of the detected temperature and determines on/off of execution of the aberration adjustment based on a degree of the temperature change.

11. The recording/reproducing apparatus according to claim 1, wherein at least one of the focus bias adjustment means and the aberration adjustment means carries out frequency filtering for removing a defect component of the data recording surface of the optical disc based on a calculation result.

12. The recording/reproducing apparatus according to claim 1, wherein the aberration adjustment means carries out, in a case where the optical disc includes a plurality of recording layers, the aberration adjustment only when seek at a time the aberration correction value is changed from plus to minus is seek within the same recording layer.

13. The recording/reproducing apparatus according to claim 1, wherein the evaluation value generation means generates the evaluation value using at least one of a jitter value of a reproduction RF signal, an amplitude value of the reproduction RF signal, an amplitude value of a wobble signal, and a reproduction error rate.

14. The recording/reproducing apparatus according to claim 1, further comprising:
a storage section to store, with a value set as the focus bias setting value at a time of a start-up of the recording/reproducing apparatus being a focus bias initial value and a value set as the aberration correction setting value at the time of the start-up of the recording/reproducing apparatus being an aberration adjustment initial value, the focus bias initial value and the aberration adjustment initial value for each of a plurality of recording layers of the optical disc; and
initial value adjustment means for obtaining, in a case where the optical disc includes the plurality of recording layers, the focus bias initial value and the aberration adjustment initial value for each of the plurality of recording layers at the time of the start-up of the recording/reproducing apparatus and storing the values in the storage section, wherein the first correction means sets, when a movement of a read position occurs among the plurality of recording layers after the start-up, a sum of a latest focus bias value obtained by the focus bias adjustment means before the movement and the focus bias initial value of the recording layer as a movement destination, that is stored in the storage section, as the focus bias setting value, and the second correction means sets, when a movement of the read position occurs among the plurality of recording layers after the start-up, a sum of a latest aberration correction value obtained by the aberration adjustment means before the movement and the aberration adjustment initial value of the recording layer as the movement destination, that is stored in the storage section, as the aberration correction setting value.

15. The recording/reproducing apparatus according to claim 1, further comprising:
third correction means for correcting a tilt adjustment of the optical disc in a radial direction based on a tilt adjustment value; and
tilt adjustment means for carrying out, in parallel with an update of the aberration correction value set by the second correction means, a tilt adjustment of calculating a new tilt adjustment value based on the evaluation value generated by the evaluation value generation means every time a third cycle passes.

16. The recording/reproducing apparatus according to claim 15, wherein the tilt adjustment means obtains a differential between a fifth evaluation value of a fifth section in which the tilt adjustment value set by the third correction means is changed to plus and a sixth evaluation value of a sixth section in which the tilt adjustment value obtained right after the fifth section is changed to minus, and calculates the new tilt adjustment value using the current differential value, a previous differential value, and the tilt adjustment value set by the third correction means.

17. The recording/reproducing apparatus according to claim 16, wherein the tilt adjustment means changes plus and minus of the tilt adjustment value at a first seek timing after an aberration adjustment calculation is carried out one or more times by the aberration adjustment means.

18. The recording/reproducing apparatus according to claim 17, wherein the tilt adjustment means carries out the tilt adjustment when a movement amount by the seek in the disc radial direction is equal to or smaller than a predetermined value.

19. The recording/reproducing apparatus according to claim 16, wherein the aberration adjustment means obtains a differential between a third evaluation value of a third section in which the aberration correction value set by the second correction means is changed to plus and a fourth evaluation value of a fourth section in which the aberration correction value obtained right after the third section is changed to minus, calculates the new aberration correction value using the current differential value, a previous differential value, and the aberration correction value set by the second correction means, and alternately switches an order of the third section in which the aberration correction value is changed to plus and the fourth section in which the aberration correction value is changed to minus.

20. The recording/reproducing apparatus according to claim 19, wherein the tilt adjustment means alternately switches an order of the fifth section in which the tilt adjustment value is changed to plus and the sixth section in which the tilt adjustment value is changed to minus.

21. The recording/reproducing apparatus according to claim 16, further comprising:
temperature detection means for detecting a temperature, wherein the tilt adjustment means corrects a displacement amount of plus and minus of the tilt adjustment value based on the detected temperature.

22. The recording/reproducing apparatus according to claim 16, further comprising:
temperature detection means for detecting a temperature; and
a temperature information storage section that acquires, from the temperature detection means, information on the temperature obtained at a time of the tilt adjustment by the tilt adjustment means and stores the information, wherein the tilt adjustment means calculates the tilt adjustment value while taking into account a fluctuation amount between the temperature stored in the temperature information storage section and the current temperature at a time the tilt adjustment is newly carried out.

23. The recording/reproducing apparatus according to claim 22, wherein the temperature information storage section stores the information on the temperature for each area obtained by dividing the optical disc based on a position on a radius, and the tilt adjustment means reads out the information on the temperature corresponding to the area to which a current position on the radius of the optical disc belongs from the temperature information storage section and calculates the tilt adjustment value while taking into account the fluctuation amount between the temperature stored in the temperature information storage section and the current temperature at the time the tilt adjustment is newly carried out.

24. The recording/reproducing apparatus according to claim 1, wherein
the focus bias adjustment means calculates the new focus bias value by $$u(q) = u(q-1) + K_{1P}\{y(q) - y(q-1)\} + K_{1i}T_1\left\{\frac{y(q) + y(q-1) - 2y_{target}}{2}\right\},$$

where u(q) is a focus bias value calculated in a q-th focus bias adjustment, u(q−1) is a focus bias value calculated in a (q−1)-th focus bias adjustment, y(q) is an evaluation value differential measured in the q-th focus bias adjustment, y(q−1) is an evaluation value differential measured in the (q−1)-th focus bias adjustment, $y_{target}$ is a target value of an evaluation value differential, $T_1$ is an adjustment interval, $K_{1P}$ is a proportional gain, and $K_{1i}$ is an integral gain, and
the aberration adjustment means calculates the new aberration correction value by $$v(r) = v(r-1) + K_{2P}\{z(r) - z(r-1)\} + K_{2i}T_2\left\{\frac{z(r) + z(r-1) - 2z_{target}}{2}\right\},$$

where v(r) is an aberration correction value calculated in an r-th aberration adjustment, v(r−1) is an aberration correction value calculated in an (r−1)-th aberration adjustment, z(r) is an evaluation value differential measured in the r-th aberration adjustment, z(r−1) is an evaluation value differential measured in the (r−1)-th aberration adjustment, $z_{target}$ is a target value of an evaluation value differential, $T_2$ is an adjustment interval, $K_{2P}$ is a proportional gain, and $K_{2i}$ is an integral gain.

25. A focus bias and aberration adjustment method of a recording/reproducing apparatus including a first correction section that corrects a position of an objective lens that collects laser light emitted from a light source on a data recording surface of an optical disc based on a focus bias setting value obtained based on a focus bias value, and a second correction section that corrects an aberration of the laser light based on an aberration correction setting value obtained based on an aberration correction value, the method comprising:
generating an evaluation value by digitizing a quality of a reproduction signal;
changing plus and minus of the focus bias value and calculating a new focus bias value based on the generated evaluation value upon a reception of a read command; and
changing, in parallel with an update of the focus bias value set by the first correction section, plus and minus of the aberration correction value and calculating a new aberration correction value based on the generated evaluation value upon the reception of the read command.

* * * * *